United States Patent
Berlyoung et al.

(10) Patent No.: US 7,177,412 B2
(45) Date of Patent: *Feb. 13, 2007

(54) MULTI-MEDIA COMMUNICATION MANAGEMENT SYSTEM WITH MULTICAST MESSAGING CAPABILITIES

(76) Inventors: Danny L. Berlyoung, 965 Hunt St., Akron, OH (US) 44036; Calvin E. Lewis, 3760 Fairway Park Dr., Suite 206, Copley, OH (US) 44321; Rodney A. Ross, 3076 Ridgewood Rd., Fairlawn, OH (US) 44333

( * ) Notice: Subject to any disclaimer, the term of this patent is extended or adjusted under 35 U.S.C. 154(b) by 971 days.

This patent is subject to a terminal disclaimer.

(21) Appl. No.: 10/079,128

(22) Filed: Feb. 20, 2002

(65) Prior Publication Data

US 2003/0058858 A1 Mar. 27, 2003

Related U.S. Application Data

(63) Continuation-in-part of application No. 09/961,532, filed on Sep. 24, 2001, and a continuation-in-part of application No. 10/000,543, filed on Oct. 23, 2001.

(51) Int. Cl.
*H04M 3/42* (2006.01)
*H04M 1/64* (2006.01)
*H04M 11/00* (2006.01)

(52) U.S. Cl. .............................. 379/202.01; 379/88.11; 379/88.13; 379/908

(58) Field of Classification Search ............. 379/88.11, 379/88.13, 88.14, 202.01, 203.01, 204.01, 379/205.01, 206.01, 908
See application file for complete search history.

(56) References Cited

U.S. PATENT DOCUMENTS

| | | | |
|---|---|---|---|
| 4,817,127 A | | 3/1989 | Chamberlin et al. |
| 5,473,363 A | * | 12/1995 | Ng et al. .................. 348/14.09 |
| 5,483,586 A | | 1/1996 | Sussman |
| 5,483,588 A | * | 1/1996 | Eaton et al. ........... 379/202.01 |

(Continued)

OTHER PUBLICATIONS

Symbol Technologies, Press Release, Symbol Announces Wireless LAN Telephone System, Jan. 19, 1998.

*Primary Examiner*—Bing Q. Bui
(74) *Attorney, Agent, or Firm*—Timothy P. OHagan

(57) ABSTRACT

The multi-media communication management system comprises a controller that interfaces with a plurality of communication space stations and with one or more communication medium service providers. The controller provides for multicasting or real time voice communications to selected recipients. To provide such multicasting, the controller receives a recipient list of subscribers to include in the multicast session. The controller identifies a communication space station serving a subscriber device associated with each recipient and invites such communication space station to the multicast session. If a recipient's subscriber device is not served by a communication space station, the multicast message is packaged as an audio file and sent to the recipient by e-mail.

4 Claims, 15 Drawing Sheets

U.S. PATENT DOCUMENTS

| | | |
|---|---|---|
| 5,550,907 A | 8/1996 | Carlsen |
| 5,655,015 A | 8/1997 | Walsh et al. |
| D389,146 S | 1/1998 | Tan |
| 5,742,905 A | 4/1998 | Pepe et al. |
| 5,799,068 A | 8/1998 | Kikinis et al. |
| 5,870,549 A | 2/1999 | Bobo, II |
| 5,916,302 A | 6/1999 | Dunn et al. |
| 5,917,543 A | 6/1999 | Uehara |
| 5,983,073 A | 11/1999 | Ditzik |
| 6,148,068 A * | 11/2000 | Lowery et al. ........ 379/202.01 |
| 6,178,237 B1 * | 1/2001 | Horn .................... 379/202.01 |
| 6,188,677 B1 | 2/2001 | Oyama et al. |
| 6,192,119 B1 * | 2/2001 | Wilson ................ 379/202.01 |
| 6,240,168 B1 | 5/2001 | Stanford et al. |
| 6,272,214 B1 * | 8/2001 | Jonsson ............... 379/202.01 |
| 6,275,575 B1 * | 8/2001 | Wu ...................... 379/202.01 |
| 6,304,648 B1 * | 10/2001 | Chang .................. 379/202.01 |
| 6,330,244 B1 | 12/2001 | Swartz et al. |
| 6,330,321 B2 | 12/2001 | Detampel, Jr. et al. |
| 6,366,653 B1 | 4/2002 | Yeh et al. |
| 6,366,771 B1 | 4/2002 | Angle et al. |
| 6,389,005 B1 | 5/2002 | Cruickshank |
| 6,396,907 B1 | 5/2002 | Didcock |
| 6,404,772 B1 | 6/2002 | Beach et al. |
| 6,424,711 B1 | 7/2002 | Bayless et al. |
| 6,429,855 B2 | 8/2002 | Pabon et al. |
| 6,539,499 B1 | 3/2003 | Stedman et al. |
| 6,577,609 B2 | 6/2003 | Sharony |
| 6,600,734 B1 | 7/2003 | Gernert et al. |
| 6,792,295 B1 | 9/2004 | Hanevich et al. |
| 7,035,230 B1 * | 4/2006 | Shaffer et al. ............... 370/261 |
| 2002/0085535 A1 | 7/2002 | Williams |
| 2002/0086702 A1 | 7/2002 | Dimenstein et al. |
| 2003/0035381 A1 * | 2/2003 | Chen et al. ................. 370/261 |

* cited by examiner

245 →

CURRENT NETWORK LOCATION TABLE

SUBSCRIBER IDENTIFIER
237

| SUBSCRIBER ID | SUBSCRIBER NAME | SUBSCRIBER DEVICE ID | CURRENT NETWORK ADDRESS |
|---|---|---|---|
| 1234 | BOB | 001 | 192.168.abc.xyz |
| 1235 | CHRIS | 002 | 192.168.def.uvw |
| 1236 | MARVIN | 003 | Open |
| . | . | . | . |
| . | . | . | . |
| . | . | . | . |

ADDRESS BOOK

| GROUP NAME | SUBSCRIBER NAME | CONTACT INFORMATION |
|---|---|---|
| ALL CAMPUS | ANNETTE, BILL, CINDY, DAN, ELAIN . . . | XXXXX |
| BUILDING A | ANNETTE, BILL, HOMER, IRENE | XXXXX |
| . | . | |
| . | . | |
| ANNETTE | ANNETTE | EMAIL, TELEPHONE, ETC. |

FIG. 8B

MULTI-MEDIA COMMUNICATION MANAGEMENT SYSTEM WITH MULTICAST MESSAGING CAPABILITIES

CROSS REFERENCE TO RELATED APPLICATIONS

The present application is a continuation in part of U.S. patent application Ser. No. 09/961,532 titled Teledata Space and Docking Station with Modular and Integrated Display filed on Sep. 24, 2001, and is a continuation in part of U.S. patent application Ser. No. 10/000,543 filed on Oct. 23, 2001, titled Modular Multi-Media Communication Management System, the contents of both such patent applications are incorporated herein.

TECHNICAL FIELD

The present invention relates generally to managing multi-media communications, and more particularly to a modular system for multicasting a subscribers paging message to a plurality of stations, each of which is associated with a message recipient.

BACKGROUND OF THE INVENTION

In today's office environment, it is common for a person to rely on a combination of communication devices for his or her multi-media communication needs. For example, a person may utilize an e-mail system, a desk top telephone, a voice mail system, a mobile telephone, a cellular telephone, a fax machine, a wireless pager, and a building wide or campus wide loud speaker paging system (either overhead loud speakers or through the loud speaker in each desk top telephone), and an e-mail system.

Each of the above listed systems is tailored to provide a convenient system for providing certain types of communications but is unsuited for other types of communications. For example, the e-mail system and the fax machine are convenient for written communication but are unsuited for a real time voice conversation. The desk top telephone is well suited for providing a high quality of service voice conversation but is unsuited for providing voice conversation when the user is not at his or her desk. On the other hand, a mobile telephone or cellular telephone is well suited for providing voice conversation to a mobile user, but the quality of service is typically not as high as the quality of service of the desk top telephone.

E-mail and voice mail are both well suited for delivery of private text and audio messages respectively, but are unsuited for real time delivery of such messages because both require the person to access such systems to retrieve their messages. On the other hand, a wireless pager is a convenient system for real time delivery of private text messages to a mobile user, but is unsuited for delivery of voice messages and the loud speaker paging system is well suited for real time delivery of voice messages across an entire building or campus, but is unsuited for delivery of private or personal messages to a smaller or otherwise controlled group of recipients.

What is needed is a multi media communication management system that provides for real time delivery of private audio messages to mobile users and that does not suffer the disadvantages of the existing communication systems.

SUMMARY OF THE INVENTION

The multi-media communication management system comprises a control unit that interfaces with a plurality of communication space stations, and their associated subscriber device(s), and with one or more communication medium service providers. The control unit translates multi-media communications received from a multi-media service provider into the protocols required for use by the communication space stations as well as any conventional telephone stations that may be coupled to the control unit. The communication and control signaling between the control unit and the communication space stations may be wireless in nature with the communication space stations may each be powered by an internal battery and/or connection to a local source of conventional line power.

The architecture of the communication space station is modular. Multiple functional elements can be interconnected with backbone communication circuitry to form an integrated communication platform. Modular docking interfaces may be used to couple the space station communication device to portable subscriber devices and to enable integrated and coordinated communication through multiple communication medium service providers. This coordinated and integrated system architecture enables the space station communication device to merge the functionality and internal data of the various portable subscriber devices into the space station communication device, to direct the functionality and data of the space station communication device to a selected one of the portable subscriber devices, and to provide the subscriber with a simple subscriber interface.

The multi-media communications may include multicast paging to selected subscribers. The control unit may select communication space stations to include in a multicast session group by determining which communication space stations are serving a subscriber device associated with a selected subscriber. If the selected subscriber is not served by a communication space station, the multicast message may be delivered to the subscriber as an audio (or audio and video) file by the subscriber's e-mail system.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 8a is a table diagram representing a present network location table in accordance with one embodiment of the present invention;

FIG. 8b is a table diagram representing a multicast group table in accordance with one embodiment of the present invention;

DETAILED DESCRIPTION OF THE DRAWINGS

Figure 1:
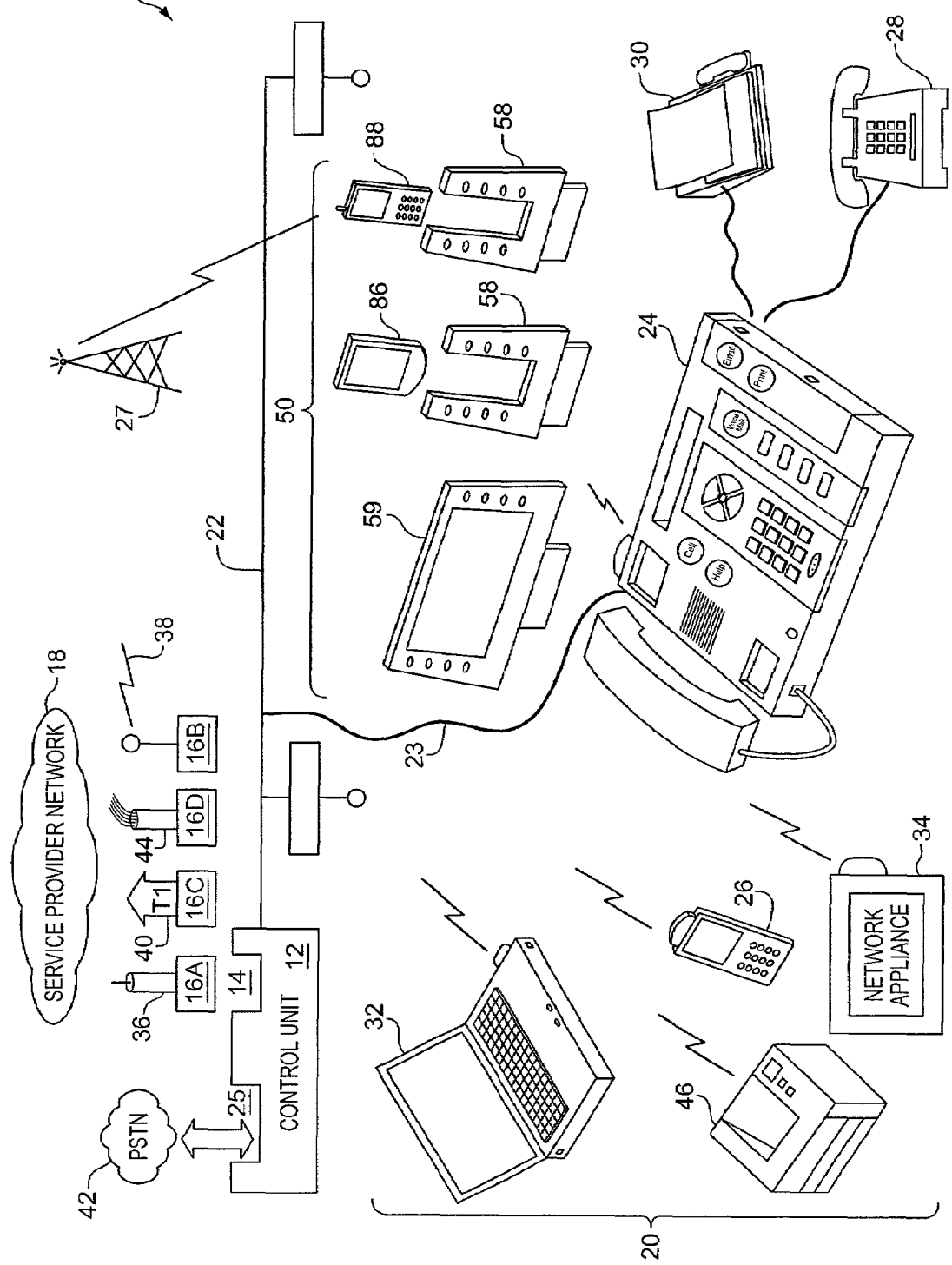
FIG. 1 is a block diagram view of a multi-media communication management system in accordance with one embodiment of the present invention.

The present invention is now described in detail with reference to the drawings. In the drawings, each element with a reference number is similar to other elements with the same reference number independent of any letter designation following the reference number.

It should also be appreciated that many of the elements discussed in this specification may be implemented in hardware circuit(s), a processor executing software code, or a combination of a hardware circuit and a processor executing code. As such, the term circuit or module as used throughout this specification is intended to encompass a hardware circuit (whether discrete elements or an integrated circuit block), a processor executing code, or a combination of a hardware circuit and a processor executing code, or other combinations of the above known to those skilled in the art.

Referring to FIG. 1, an exemplary architecture of the multi-media communication management system 10 of the present invention is shown. The multi-media communication management system 10 includes a control unit 12 that is coupled with a plurality of local communication devices 20 over a wireless Local Area Network 22 (or by a wired network connection 23 to the backbone wired network of the wireless Local Area Network 22). The local communication devices 20 may include: subscriber stations 24 (communication space stations 24), wireless dialog handsets 26, traditional telephone handsets 28, traditional fax machines 30 (both coupled through communication space station 24), traditional computer systems 32, network printers 46, and various network appliances 34.

The control unit 12 includes a circuit switched provider bay 25 which operatively couples the control unit 12 to one or more subscriber loops of the Public Switched Telephone Network (PSTN) 42 and includes a multi-media communication service provider bay 14 which operatively couples the control unit 12 to a multi-media Service Provider network 18 through one of a plurality of communication medium modules 16a–16d. In the exemplary embodiment, the multi-media Service Provider network 18 may utilize the Internet Protocol Suite for communication at the IP level, but may be proprietary at the data link and physical layers. As such, the control unit 12 includes the IP stacks applicable for communication between applications over the multi-media Service Provider network 18 and each module 16a–16d includes the applicable data link and physical layer circuits for communication of IP frames over the physical medium of the multi-media Service Provider network 18a–18d.

Some illustrative examples of communication modules include: communication module 16a which may be a cable modem module for communicating over coaxial cable 36 with a multi-media communication service provider such as a local cable company, communication module 16b which may be a wide area network radio for communication over a wireless spectrum channel 38 with a wide area wireless multi-media communication service provider such as an analog or digital cellular/PCS telephone service provider, communication module 16c which may be a customer service unit (CSU) for communication over a T1 line 40 with a multi-media communication provider such as a local telephone service provider, and communication module 16d which may be an optical modem for communication over a fiber channel 44 with a fiber optic multi-media communication service provider. In operation, the control unit 12 integrates and manages multi-media communication between two or more local communication devices 20 and between each local communication device 20 and a remote communication system(s) (not shown) coupled to either the multi-media Service Provider network 18 or the Public Switched Telephone Network 42.

Figure 2:
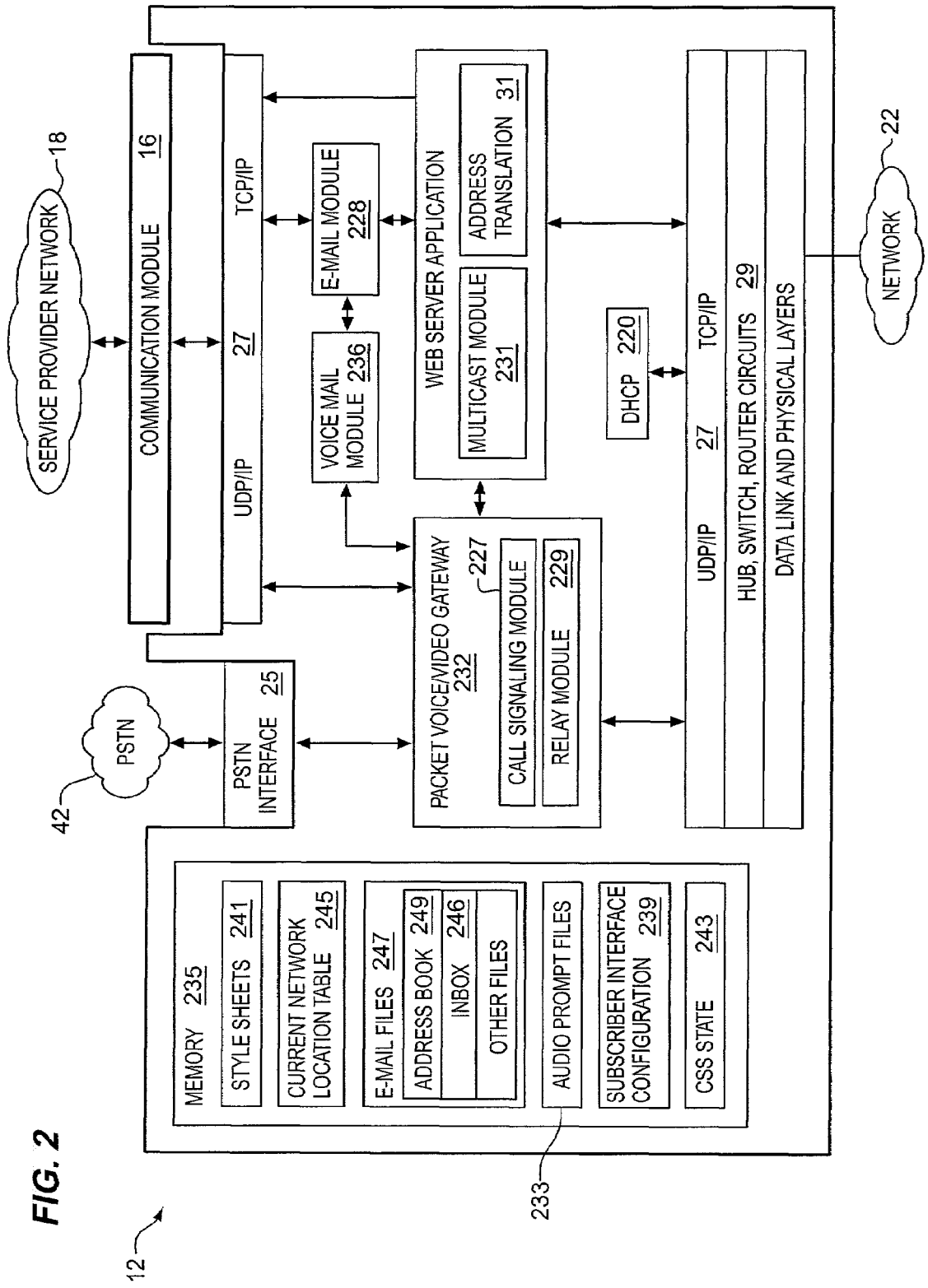
FIG. 2 is a block diagram of a multi-media communication management system control unit in accordance with one embodiment of the present invention.

FIG. 2 shows a block diagram of an exemplary control unit 12. The control unit 12 includes applicable modules for managing the Local Area Network 22 as an IP network. Such modules may include an applicable combination of hubs, routers, and switches 29 for managing communications over the Local Area Network 22 as well as an address server 220 (e.g. DHCP server) for assigning local IP addresses to each local communication device 20. The control unit 12 may also include a packet voice/video gateway 232, a voice mail module 236, an e-mail module 228, and a web server application 230. The packet voice/video gateway 232 provides a subscriber's real time full duplex voice communication and voice/video communication services. The services may include routing and maintaining a subscriber's outgoing calls and incoming calls. A subscriber's outgoing calls may comprise voice calls, audio/visual calls, and multi-party conference calls (either voice or audio/visual) that are originated by a communication space station 24 that is associated with the subscriber. The destination(s) may be remote packet voice/video devices coupled to the multi-media Service Provider network 18, remote telephones coupled to the Public Switched Telephone Network 42, or other subscriber's served the multi media communication management system 10. A subscriber's incoming calls may comprise calls (either voice or audio/visual) that are originated by a remote telephone device coupled to the Public Switched Telephone Network 42, remote packet audio/visual devices coupled to the multimedia Service Provider network 18, communication space stations 24, or the audio/visual conference module and identify the subscriber as the destination subscriber.

The packet voice/video gateway 232 communicates over the Local Area Network 22 and the multi-media Service Provider Network 18 utilizing IP protocols as discussed herein. However, voice communication over the Public Switched Telephone Network 42 utilized analog or Public Switched Telephone Network digital voice signals. As such, the control unit 12 includes a Public Switched Telephone Network interface 25 that includes circuits for translating between the Public Switched Telephone Network call signaling with its analog or digital voice communication and the call signaling and digital voice communication formats and protocols used by the packet voice/video gateway 232. Therefore, for the sake of simplicity, he discussion of the packet voice/video gateway 232 herein refers to Public Switched Telephone Network interface 25 as an originating or destination device with which a voice call may be established and maintained. However, it should be appreciated that the Public Switched Telephone Network interface 25 is not the ultimate origination or destination but is operating to interface the packet voice/video gateway 232 to a telephone system on the Public Switched Telephone Network 42 with which it could not communication directly.

Figure 11:
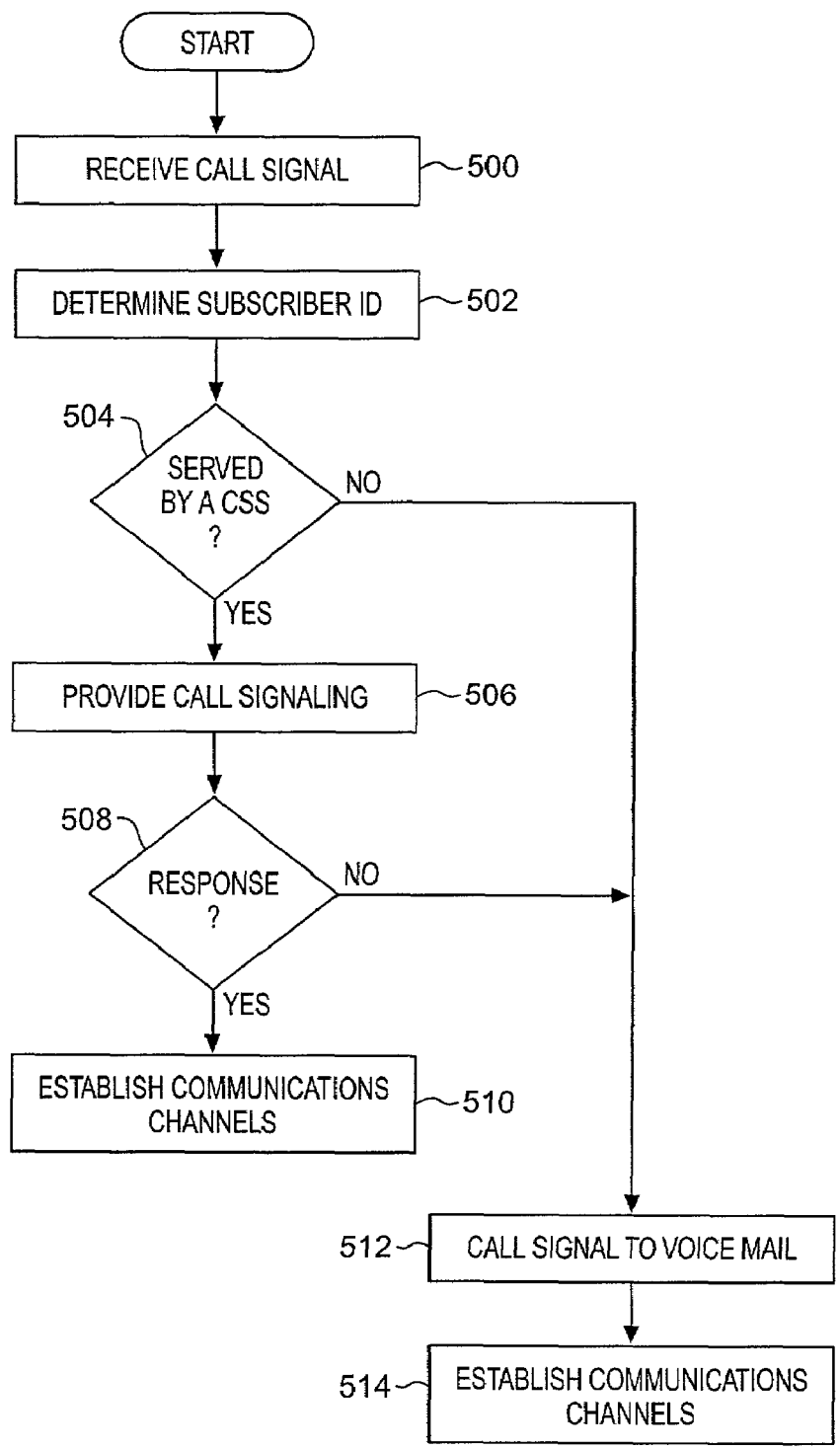
FIG. 11 shows a flow chart representing exemplary operation of packet audio/video gateway in accordance with one embodiment of the present invention.

The packet voice/video gateway 232 includes a call signaling module 227. The call signaling module 227 includes circuits for receiving call signaling messages from an originating device, identifying a destination device, providing call signaling messages to the destination device, and, if responded to by the destination device, negotiating compression algorithms and establishing channel usage for the relay of real time voice or audio/visual communications. For inbound calls, the call signaling message provided by the originating device may identify a subscriber served the multi-media communication management system 10. The call signaling module 227 identifies the communication space station 24 that is presently serving the subscriber device 50 that is assigned to the identified subscriber. Referring to FIG. 11 in conjunction with the network location table 245 of FIG. 8a, the process of identifying a destination device is shown.

Step 500 represents receipt by the multi-media communication management system 10 of the call signaling message identifying the subscriber who is the called party. In the exemplary embodiment, each subscriber is assigned a four digit subscriber identifier number that corresponds to the last four digits of a Public Switched Telephone Network direct dial number that routes to the Public Switched Telephone Network interface 25 when dialed on the Public Switched Telephone Network. As such, the call signaling message, whether provided by an originating device coupled to multi-media Service Provider network 18, an originating device coupled to Local Area Network 22, or the Public Switched Telephone Network interface 25, may include the subscriber identifier number to identify the destination subscriber.

At step 502, the call signaling module 227 identifies a subscriber device 50 (FIG. 1) that is associated with the identified subscriber by utilizing the network location table 245 that is maintained in memory 235. To associate each subscriber with their subscriber device 50, the network location table 245 includes a record for each subscriber. Within such record is a plurality of data fields that identify: the subscriber, the four digit subscriber identifier associated with the subscriber, and a subscriber device ID code that is unique to the subscriber device 50 that is assigned to the subscriber.

At step 504, the call signaling module 227 identifies whether the subscriber's subscriber device 50 is served by a communication space station 24. The network location table 245 further includes a field that may comprise the network address of the communication space station 24 that is then presently serving the subscriber device 50 assigned to the subscriber. The address within this field is updated when the subscriber moves their subscriber device 50 from one communication space station 24 to another using the circuits and methods discussed herein. If the subscriber device is not presently served by any communication space station 24, then this field indicates this state using an indicator such as the term "open".

If at step 504, the call signaling module 227 determines that the subscriber device 50 assigned to the subscriber is not presently served by any communication space station 24, the voice mail module 236 becomes the default destination device to which call signaling is provided at step 512. However, if the subscriber device 50 is served by a communication space station 24, such communication space station 24 becomes the destination device to which call signaling is provided at step 506.

Step 508 represents the call signaling module 227 determining whether the communication space station 24 is responding to the call signaling. In certain events, such as when the subscriber is already engaged in a telephone call or if the subscriber does not answer the inbound call, the communication space station 24 does not respond to the call signaling. In which case, the voice mail module 236 again becomes the default destination device to which call signaling is provided at step 512.

If the call signaling is responded to by the communication space station 24, the call signaling module 227 negotiates compression algorithms and establishes communication channels with both the communication space station 24 and with the originating device to relay voice or audio/visual real time communications for the duration of the call.

If call signaling is provided to the voice mail module 236 at step 512, the call signaling module 227 negotiates compression algorithms and establishes communication channels only to the originating device to relay real time voice communications between the voice mail module 236 and the originating device until the originating device is disconnected from the voice mail module 236.

Returning to FIG. 2, for outbound calls, the call signaling module 227 may be provided with a number that represents the intended destination. The number may be a 10 digit number routable on the Public Switched Telephone Network, a number identifying a person or station coupled to the multi-media Service Provider network 18, or a subscriber ID representing a subscriber to the multi-media communication management system 10. The call signaling module 227 may identify the destination device first by determining whether the number represents a person or destination coupled to the multi-media Service Provider network 18, the Public Switched Telephone Network routable telephone number, or a subscriber. The call signaling module 227 may refer to a directory within memory 235 that maps possible numbers to one of the three networks. It should be appreciated that a Public Switched Telephone Network routable telephone number may also represent a person or station coupled to the multi-media Service Provider network 18. As such, the directory within memory 235 may include a priority such that the call signaling model attempts to establish call signaling utilizing multi-media Service Provider network 18 as a first priority and the Public Switched Telephone Network 42 as a second priority.

If the destination device is coupled to the multi-media Service Provider network 18, the number may be permanently assigned to a person or a station, however, the IP network address utilized by the person or station may change periodically. As such, the call signaling module 227 may query a remote directory server to determine the network address of the destination device or the network address of a proxy for the remote device. Call signaling is then provided to the destination device or the proxy. If the call signaling is responded to by the proxy or the remote device, the call signaling module 227 negotiates compression algorithms and establishes communication channels with both the originating communication space station 24 and with proxy or remote device for the relay of voice or audio/visual real time communications for the duration of the call.

If the destination device is coupled to the Public Switched Telephone Network 42, the destination device is the Public Switched Telephone Network interface 25 and call signaling is provided to the Public Switched Telephone Network interface 25. Again, if the call signaling is responded to by the Public Switched Telephone Network interface 25 (indicating that the call has been established on the Public Switched Telephone Network 42) the call signaling module 227 negotiates compression algorithms and establishes communication channels with the originating communication space station 24 for the relay of real time voice communications between the communication space station 24 and the Public Switched Telephone Network interface 25 for the duration of the call. If the destination device is a subscriber to the multi-media communication management system 10, steps discussed above with respect to FIG. 11 are applicable.

For both inbound and outbound calls, the relay of real time voice or audio/visual communications is provided by a relay module 229 within the packet audio/video gateway 232. The relay module 229 relays sequences of real time transport protocol (RTP) frames that include compressed voice data and compressed video communications over the channels established by the call signaling module 227.

The voice mail module 226 includes circuits for respond to the call signaling provided by the call signaling module 227, providing a sequence of RTP frames representing applicable audio prompts from compressed audio prompt files 233 to the relay module 229, receiving RTP frames from the relay module 229 representing the voice of the remote caller leaving a message for the subscriber, compressing the message into a digital audio file, and sending the digital audio file to the e-mail module 228 for later retrieval by the subscriber.

The e-mail module 228 maintains an e-mail account associated with each subscriber. The e-mail module 228 includes client circuits for interfacing with a remote e-mail server to log onto an account associated with each subscriber, obtain new e-mail messages associated with the subscriber, and to send e-mail messages drafted by the subscriber. The e-mail module 228 also maintains e-mail files 247 in the memory 235 that may include an address book 249 and an inbox 246 for each subscriber.

The web server application 230 provides additional multi-media communication services provided to each subscriber. Examples of the multi-media communication services provided to each subscriber by the web server application 230 include: delivery of e-mail and voice mail messages (as e-mailed audio files) to the communication space station 24 at which the subscriber's subscriber device 50 is then presently coupled; updating of the network location table 245 to assure proper routing of incoming voice and audio/video calls; proxy communication over multi-media Service Provider network 18; and delivery of a multicast messages directed to a subscriber to the particular communication space station 24 at which their subscriber device presently coupled.

The web server application 230 includes a multicast module 231 and an address translation module 31. The multicast module 231 provides IP multicast services to enable the web server application 230 to deliver select communications to multiple communication space stations 24 simultaneously utilizing IP multicast protocols and without using excessive bandwidth on Local Area Network 22. The address translation module 31 provides address and port translation services to enable the web server to provide each communication space station 24 with access to servers coupled to the multi-media Service Provider network 18 as an IP layer proxy and without using higher layer resources of the control unit 12.

In the exemplary embodiment, non-streaming media communication between the web server application 230 and each communication space station 24 utilizes tagged data messages over a TCP/IP session between the web server application 230 and a system client application 115 (FIG. 4) within the communication space station 24. Each message transferred between the web server application 230 and the communication space station 24 comprises a data element and a tag identifying the significance of the data element. For example: if the data element comprises the text of an e-mail message, the tag would identify the data element as the text of an e-mail message; if the data element comprises an executable script that would provide for the communication space station 24 to perform a certain function, the tag would identify the data element as executable script and may identify the significance of the script; and if the data element comprises display layout control information (e.g. a style sheet) defining how another date element (such as the text of the e-mail) should be displayed on a display screen, the tag would identify the data element as a style sheet. Streaming media communications between the web server application 230 (such as multicast streaming media messages provided by the IP multicast module 231) and the system client application 115 utilize a sequence of RTP frames that include compressed media data and are sent utilizing UDP/IP channels.

To provide communication services to each subscriber, the web server application 230 processes certain scripts in response to events generated by a communication space station 24 and the packet audio/video gateway 232. In processing the scripts, the web server application 230 manages subscriber communication data stored in a memory 235 and provides operating instructions to communication space station client 24 and an e-mail module 228.

The flow charts of FIGS. 9a through 9g (which are discussed in more detail herein) represent processing scripts that in aggregate provide for a subscriber to navigate through a layered menu to select applicable services from the control unit 12. The web server application 230 maintains state information for each communication space station 24 such that each communication space station 24 may navigate through the layered menu independently of other communication space station 24 units.

Communication Space Station

Figure 3:
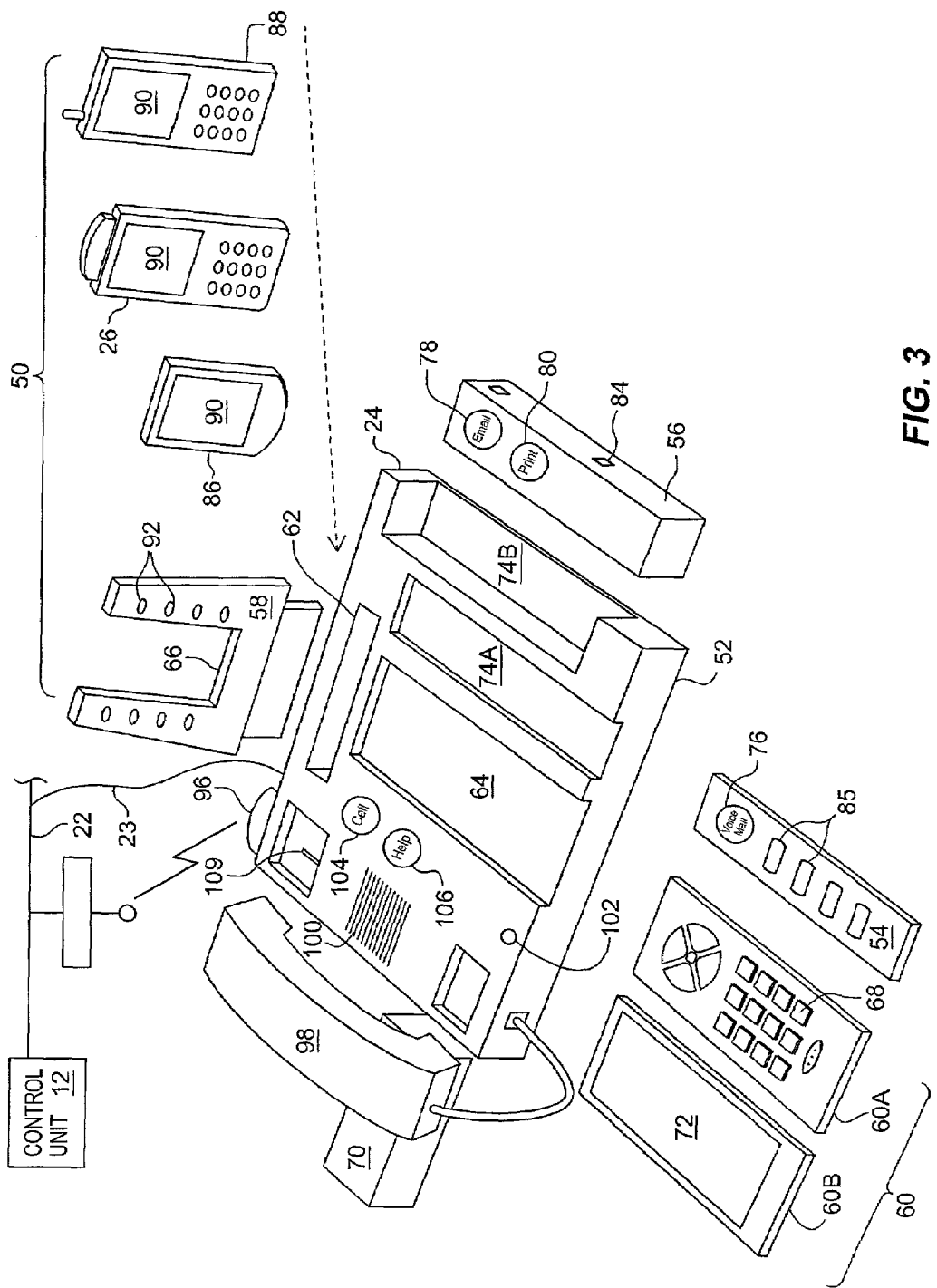
FIG. 3 is a perspective exploded view of a modular communication space station in accordance with one embodiment of the present invention.

Referring to FIG. 3, a perspective view of an exemplary communication space station 24 is shown. The communication space station 24 includes a platform unit 52 that operatively couples to the control unit 12 via either a wireless communication link between a platform unit network circuit 96 and the wireless Local Area Network 22 or a direct network connection 23 between the platform unit 52 and the backbone network of the wireless Local Area Network 22.

A plurality of functional modules 54, 56, 58, and 60 may be coupled to the platform unit 52 to form an integrated multi-media communication platform. The platform unit 52 includes a subscriber interface docking platform 64 for coupling and optionally supporting one of a plurality of modular subscriber interface units 60 to the platform unit 52. The modular subscriber interface unit 60a may include a plurality of buttons 68 in an arrangement similar to a typical telephone key pad to provide for subscriber input in a manner similar to that of a traditional telephone handset. The modular subscriber interface 60b may include a touch panel graphic display 72 to provide for subscriber input through virtual buttons visible thereon.

The platform unit 52 further includes a first function specific docking platform 74a and a second function specific docking platform 74b, each of which couples to a plurality of function specific modules 54 and 56. The first function specific docking platform 74a is a shallow platform for coupling to function specific modules that primarily comprise function specific buttons or other circuits that may be placed within a thin module. The second function specific docking platform 74b is a larger platform for coupling to function specific modules with more complex internal circuits requiring the additional size.

In the exemplary embodiment, the function specific module 54 may include subscriber interface buttons configured for enhancing voice communication through the communication space station 24 such as a voice message control 76 for single button access to voice message files and voice management controls 85 for single button control of enhanced voice management functions.

The function specific module 56 may include circuits configured for enhancing data communication through the communication space station 24 such as an e-mail control 78 for single button access to subscriber e-mail messages, a print control 80 for single button initiation of the printing of an e-mail message, and a data networking port 84.

The platform unit 52 further includes a docking bay 62 into which a modular docking interface 58 may be secured and operatively coupled to the platform unit 52. The modular docking interface 58 supports one of a plurality of modular subscriber devices 50 within a subscriber device interface bay 66 and provides for operatively coupling the modular subscriber device 50 to the platform unit 52. Exemplary configurations for the modular subscriber device 50 include a subscriber data assistant 86, a subscriber wide area network communication device 88, and the wireless LAN voice handset 26, each of which is discussed in more detail herein.

While operatively coupled to the platform unit 52, the subscriber device 50 becomes an integral part of the subscriber interface of the communication space station 24. A liquid crystal graphic display 90 on the subscriber device 50 may function to display multi-media communication management information under control of the platform unit 52 and the control unit 12. Further, programmable subscriber controls 92 positioned adjacent to the subscriber device 50 may be configured to activate platform unit 52 and control unit 12 functions in accordance with the contents of the graphic display 90 adjacent to the controls 92.

The platform unit 52 may further include one or more of the following elements: a handset 98 similar to a traditional telephone handset to provide a subscriber voice interface, a speaker 100 and a microphone 102 to provide a hands-free subscriber voice interface, a modular battery pack 70 (which fits within a battery pack bay that is not shown) for operating power when the communication space station 24 is uncoupled from a line voltage, cell button 104 for single button selection of certain functions such as a wide area network communication function, and help button 106 for single button selection of a help function.

Figure 4:
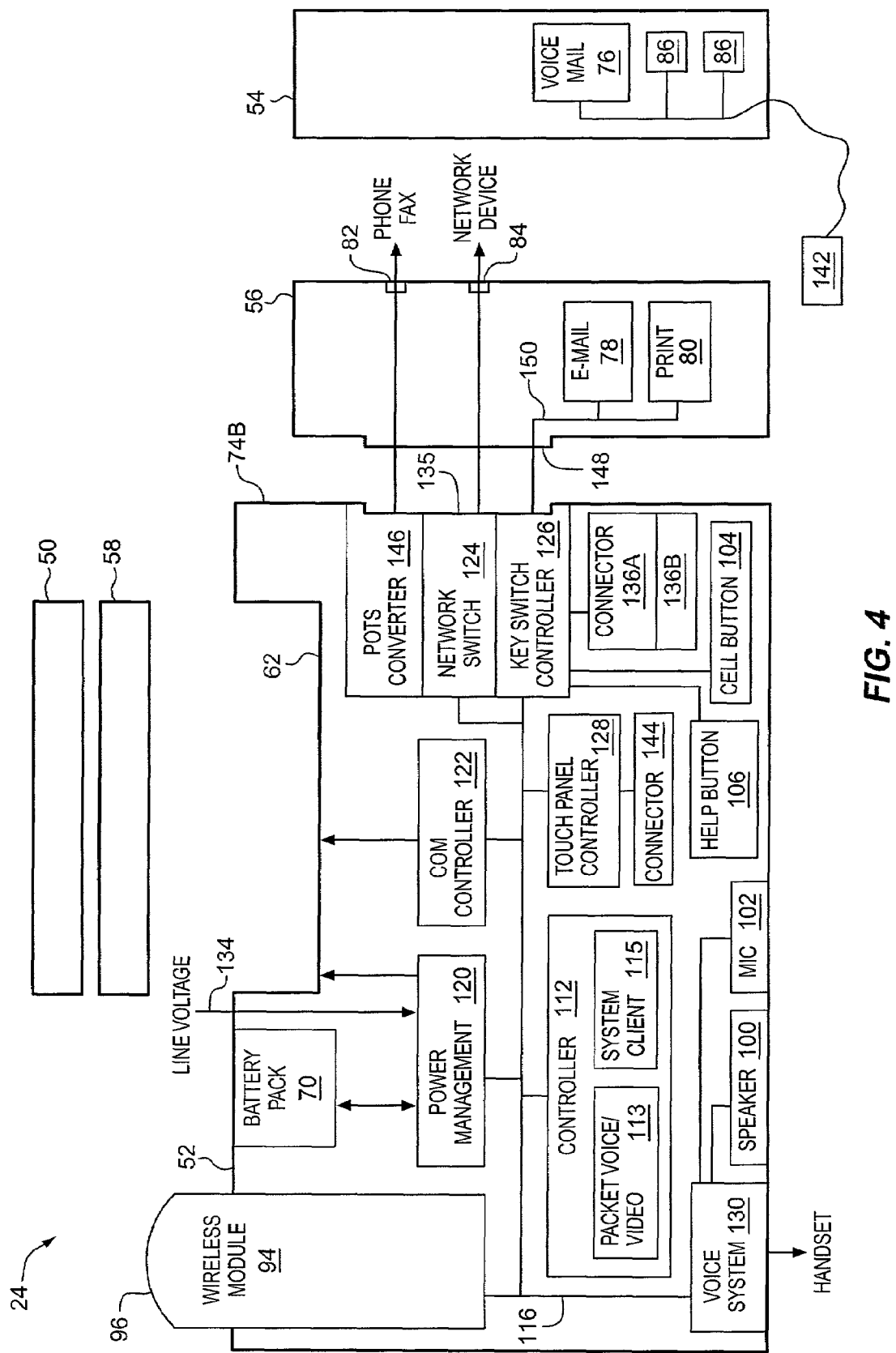
FIG. 4 is a block diagram of a communication space station in accordance with one embodiment of the present invention.

FIG. 4 shows a block diagram of the communication space station 24. The platform unit 52 includes an application controller 112 coupled to a local bus 116 that interconnects application controller 112 with a plurality of peripheral circuits that include a wireless module 94, a power management controller 120, a communication controller 122, a network switch controller 124, a key switch controller 126, a touch panel controller 128, a plain old telephone service (POTS) converter 146, and a voice communication system 130.

The wireless module 94 operatively couples the platform unit 52 with the control unit 12 over the wireless Local Area Network 22 (both of FIG. 1). The application controller 112 includes appropriate drivers for operation of the wireless module 94.

The power management controller 120 selectively receives input power from the battery pack 70 or external line voltage 134. The power management controller 120 includes appropriate circuits for converting the input power voltage to appropriate operating power required by each component of the communication space station 24. Additionally, the power management controller 120 includes appropriate circuits for managing charging of the battery pack 70 when the platform unit 52 is coupled to the line voltage 134 and generating appropriate power for operating and/or charging the modular docking interface 58 and the modular subscriber device 50 when coupled to the platform unit 52.

The communication controller 122 operatively couples the modular docking interface 58 and the modular subscriber device 50 to the controller 112 such that the platform 52 can exchange data with the modular subscriber device 50. In the exemplary embodiment the communication controller is a serial communication controller that enables the serial exchange of data with a compatible serial communication controller within the modular subscriber device 50 over a physical medium. Exemplary physical mediums include hardwired contacts, an infrared transmission, and RF transmission, however other physical mediums are envisioned and the selection of a physical medium is not critical to this invention.

The network switch controller 124 provides a network data port 84 which enables the application controller 112 to communicate with another network computing circuit over a network interface. The network switch controller 124 is coupled to a bus port 135 within the function specific docking platform 74b for coupling to a mating port 148 on the function specific module 56.

The key switch (e.g. button) controller 126 is coupled to: a connector 136a which in turn is coupled to a mating connector on the modular subscriber interface unit 60a (FIG. 3) for interconnecting the buttons 68 to the key switch controller 126; a connector 136b which in turn is coupled to a mating connector 142 on the function specific module 54 for interconnecting the buttons 76 and 85 to the key switch controller 126; the bus port 134 which in turn is coupled to a mating port 148 on the function specific module 56 for interconnecting the buttons 78 and 80 to the key switch controller 126; the cell button 104; and the help button 106. In the exemplary embodiment, the key switch controller 126 may drive row and column signals to the various buttons and, upon detecting a short between a row and a column (e.g. button activation) reports the button activation to the application controller 112 over the bus 116. Again, the application controller 112 includes appropriate drivers for operating the key switch controller 126.

The touch panel controller 128 is coupled to a connector 144 which in turn is coupled to a mating connector on the modular subscriber interface unit 60b (FIG. 3) for interconnecting the touch panel graphic display 72 to the touch panel controller 128. In the exemplary embodiment, the touch panel controller 128 may include a separate display control circuit compatible with the resolution and color depth of the touch panel graphic display 72 and a separate touch panel control circuit for detecting subscriber contact with the touch panel graphic display 72. The application controller 112 includes appropriate systems for driving the contents of the touch panel graphic display 72 through the touch panel controller 128.

The voice communication system 130 generates analog voice signals for driving the speaker 100 (or the speaker in the handset 98 of FIG. 3) and detects input from the microphone 102 (or the microphone in the handset 98) under the control the application controller 112.

The POTS converter circuit 146 provides a standard POTS port signal (e.g. tip and ring) for operation of a traditional telephone or a traditional fax machine coupled to a POTS port 82 on the function specific module 56. In operation the POTS converter 146 circuit interfaces between the POTS signal and the application controller 112.

In the exemplary embodiment, the application controller 112 executes a packet voice/video communication client 113 and a client application 115. The packet voice/video communication client 113 provides for setting up and maintaining packet voice communications with the packet voice/video gateway 232 (FIG. 2) within the control unit 12. In the exemplary embodiment, the packet voice/video communication client 113 may be one of the commercially available clients utilizing established protocols.

The system client application 115 operates as a client to the web server application 230 (FIG. 3) within the control unit 12. The system client application 115 provides for the application controller 112 to execute processing steps in accordance with instructions received from the control unit 12 and to provide messages indicating subscriber actions to the web server application 230. The processing steps may include executing control scripts or messages received from the control unit 12, generating an image on the touch panel graphic display 72 or on the graphic display 90 on the subscriber device 50 in accordance with display content and a style sheet received from the control unit 12, playing a voice stream file received from the control unit 12 through the voice system 130, executing scripts to activate the packet voice/video client 113 to set up a real time voice/video session with the packet voice/video gateway 232 (FIG. 2), providing messages to the control unit 12 indicating subscriber activation of the cell button 104, the help button 106, a touch panel virtual button, or any other button on the communication space station 24, identifying the modular configuration or subscriber interface configuration of the communication space station 24 and reporting the configuration to the control unit 12, and reporting the coupling of (and decoupling of) a subscriber device 50 and/or modules to the platform 52 of the communication space station 24 to the control unit 12.

Subscriber Data Assistant

Figure 5:
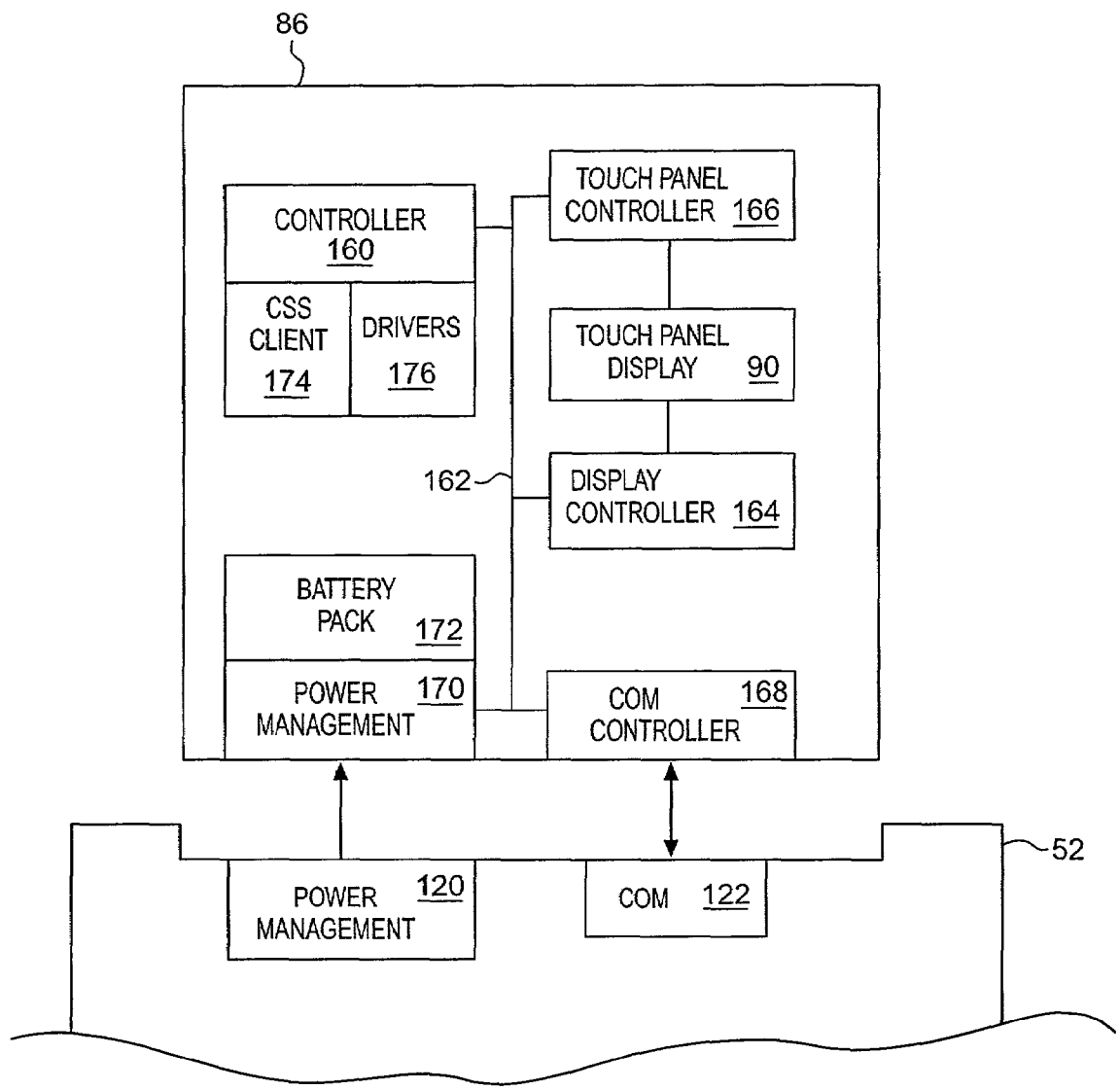
FIG. 5 is a block diagram of a subscriber data assistant in accordance with one embodiment of the present invention.

Turning to FIG. 5, an exemplary structure of a subscriber data assistant 86 is shown. The subscriber data assistant 86 includes a subscriber data assistant controller 160 interconnected to a plurality of peripheral controllers by an internal bus 162. Because of the small size and the portability of the subscriber data assistant 86, the touch panel 90 provides the primary subscriber interface. The touch panel 90 is controlled by a display controller 164 and a touch panel controller 166. The display controller 164 drives the liquid crystal display of touch panel 90 using signals compatible with the resolution and color depth of the display portion of the touch panel 90. The touch panel controller 166 detects user activation of the touch panel 90. The subscriber data assistant controller 160 operates appropriate drivers 176 for controlling operation of the touch panel controller 166 and the display controller 164.

A communication controller 168 is also coupled to the bus 162 and operates under control of the subscriber data assistant controller 160. In the exemplary embodiment, the communication controller 168 is a serial communication controller that is compatible with the communication controller 122 of the platform unit 52 (both of FIG. 4) such that data communication may occur between the platform unit 52 and the subscriber data assistant 86 when the subscriber data assistant 86 is operatively coupled to the platform unit 52.

A power management circuit 170 selectively receives input power from a battery pack 172 or from the power management circuit 120 in the platform unit 52. The power management circuit 170 includes appropriate circuits for converting the input power voltage to appropriate operating power required by each component of the subscriber data assistant 86. Additionally, the power management circuit 170 includes appropriate circuits for managing charging of the battery pack 172 when the subscriber data assistant is coupled to the platform unit 52.

The subscriber data assistant controller 160 also operates a communication space station client application 174 for displaying multi-media communication management information under control the platform unit 52 when coupled to the platform unit 52. In the exemplary embodiment the communication space station client application 174 receives messages from the platform unit 52 in the form of tagged messages. After receipt of the tagged messages, the communication space station client application 174 builds a display document to display the communication management information represented by tagged content messages in accordance with a style sheet that is compatible with the size, resolution, and color depth of the display portion of touch panel 90. The display document is then displayed on the touch panel 90.

It should be appreciated that in additional to operating the drivers 176 and the communication space station client application 174, the subscriber data assistant controller 160 may optionally operate any of the software applications that are commercially available for portable data assistants (PDAs) which may include address book management software, calendar management software, and games. While operation of such PDA applications may be useful to the subscriber, it is not critical to the operation of the present invention.

Subscriber Wide Area Network Communication Device

Figure 6:
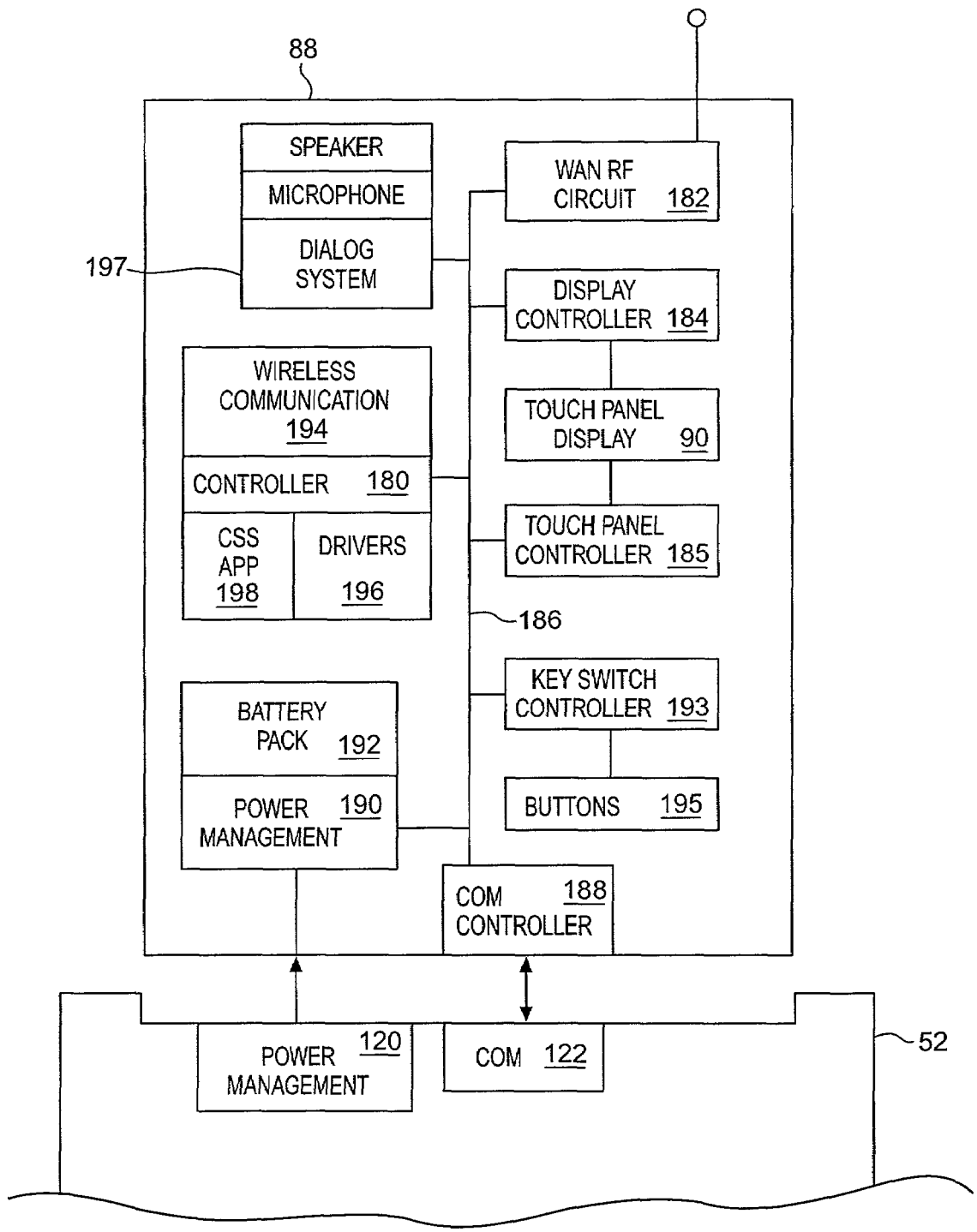
FIG. 6 is a block diagram of a wide area network communication device in accordance with one embodiment of the present invention.

Turning to FIG. 6, exemplary structure of a subscriber wide area network communication device 88 is shown. The wide area network communication device 88 includes a subscriber wide area network communication device controller 180 operating a Communication Space Station application 174', the subscriber contact directory application 178, a wireless communication application 194, and applicable drivers 196 for a plurality of peripheral controllers. The subscriber wide area network communication device controller 180 is interconnected to the plurality of peripheral controllers by an internal bus 186. The peripheral controllers include a wide area network RF circuit 182, a voice system 197, a display controller 184, a touch panel controller 185, a key switch controller 193, a communication controller 188, and a power management system 190.

The wide area network RF circuit 182 may be a circuit for transmitting and receiving signals from a wide area network service provider's medium under control of the wireless communication application 194. Exemplary wide area network service provider mediums include an analog or digital cellular or PCS telephone RF system. The key switch controller 193 is coupled to the control buttons 195. The key switch controller 193 drives row and column signals to the control buttons 195 and, upon detecting a short between a row and a column indicating button activation, reports the activation to the subscriber wide area network communication device controller 180. The control buttons 85 may be used by a subscriber for operating the wide area network communication device 88 when uncoupled form the platform unit 52.

The voice system 197 includes a speaker and a microphone. Under control of the wireless communication application 194, the voice system 197 may provide a subscriber voice interface for an audio session with a remote device over the wide area network service provider's medium. The display controller 184 drives the display 90 using signals compatible with the resolution and color depth of the display portion of touch panel 90. The display 90 may optionally be a touch panel 90 and the touch panel controller 185 detects user activation of the touch panel 90. The communication controller 188 may be a serial communication controller compatible with the communication controller 122 in the platform unit 52 such that data communication may occur between the platform unit 52 and the wide area network communication device 88 when the wide area network communication device is operatively coupled to the platform unit 52. The power management controller 190 operating with a battery pack 192, both of which may operate in a similar manner to the power management controller 170, and the battery pack 172 discussed with reference to FIG. 5.

Similar to the subscriber data assistant 86 (FIG. 5), when the wide area network communication device 88 is coupled to the platform unit 52, the Communication Space Station application 174' provides for displaying multi-media communication management information under control the platform unit 52 and provides for multi-media communication directly between the platform unit and the wide area network service provider medium.

In addition the Communication Space Station application 174' may receive messages from the platform unit 52 which may be multi-media communication messages for communication over the wide area network service provider medium. Each message includes a tag that identifies the contents of the message. After receipt of a tagged message, the Communication Space Station application 174' may identify whether the message is for communication with the wide area network service provider medium or whether it is multi-media communication management information for display. When the message is for communication with the wide area network service provider medium, the Communication Space Station application 174' reformats the message to a format compatible with wide area network service provider medium transmission standards and transmits the message using the wide area network RF circuit 182. The wide area network communication device 88 may also receive signals from the wide area network service provider medium via the wide area network RF circuit 182. When received, the Communication Space Station application 174' reformats the messages into a plurality of tagged messages for communication to the platform unit 52 and sends the tagged messages to the platform unit 52 via the communication controller 188.

Wireless Voice Handsets

Figure 7:
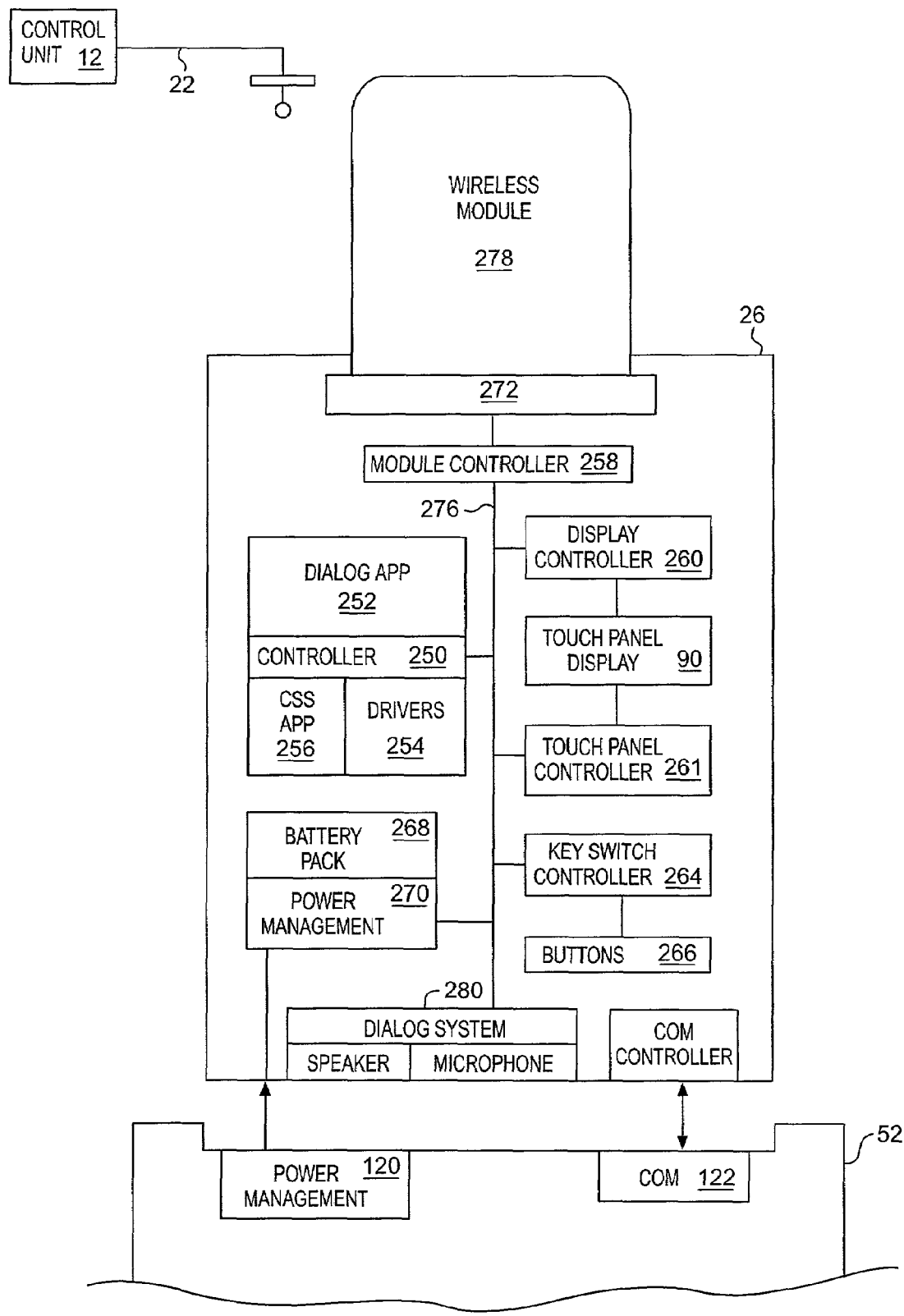
FIG. 7 is a block diagram of a wireless dialog handset in accordance with one embodiment of the present invention.

FIG. 7 shows a block diagram of an exemplary wireless voice handset 26. The wireless voice handset 26 includes a network circuit 278 and a wireless voice handset controller 250 that operates a Communication Space Station application 174", the subscriber contact directory application 178, a LAN communication application 252, and applicable drivers 254 for each of a plurality of peripheral controllers. The wireless voice handset controller 250 is interconnected by a bus 276 to the plurality of peripheral controllers which include a module controller 258, a display driver 260, a touch panel driver 261, a key switch controller 264, and a power management circuit 270.

The module controller 258 operatively couples the network circuit 278 to the wireless voice handset controller 250 such that the wireless voice handset 26 may communicate with the control unit 12 over the wireless Local Area Network 22 (both of FIG. 1). In the exemplary embodiment, the module controller 258 may be a PCMCIA controller circuit and the network circuit 278 is configured as a PCMCIA card that coupled to the module controller 258 through a PCMCIA connector 272. The LAN communication application 252 operates the network circuit 278 for communicating with the control unit 12 using appropriate wireless signaling protocols. The key switch controller 264 is coupled to the control buttons 266. The key switch controller 264 drives row and column signals to the control buttons 266 and, upon detecting a short between a row and a column indicating button activation, reports the activation to the wireless voice handset controller 250. The control buttons may be used by a subscriber for operating the wireless voice handset 26 when uncoupled form the platform unit 52. The display controller 260 drives the display 90 (optionally a touch panel 90) using signals compatible with the resolution and color depth of the display 90. The touch panel controller 261 detects user activation of the touch panel 90. The power management controller 270 operates in conjunction with a battery pack 268, both of which may operate in a similar manner to the power management controller 170, and the battery pack 172 discussed with reference to FIG. 5.

When the wireless voice handset 26 is coupled to the platform unit 52, the Communication Space Station application 174" provides for displaying multi-media communication management information under control the platform unit 52. Additionally, the Communication Space Station application 174" may receive multimedia communication management information content messages and control messages directly from the control unit 12 via the wireless network 22. After receipt of the tagged messages from either the platform unit 52 or the control unit 12, the Communication Space Station application 174" builds a document to display the communication management information represented by the tagged content messages in accordance with display layout control messages that are compatible with the size, resolution, and color depth of the display portion of the touch panel 90. The display document is then displayed on the touch panel 90.

Web Server Application

Referring to FIGS. 9a through 9g in conjunction with FIG. 2, exemplary processing steps performed by the web server application 230 to provide communication services to a communication space station 24 are shown.

Figure 9B:
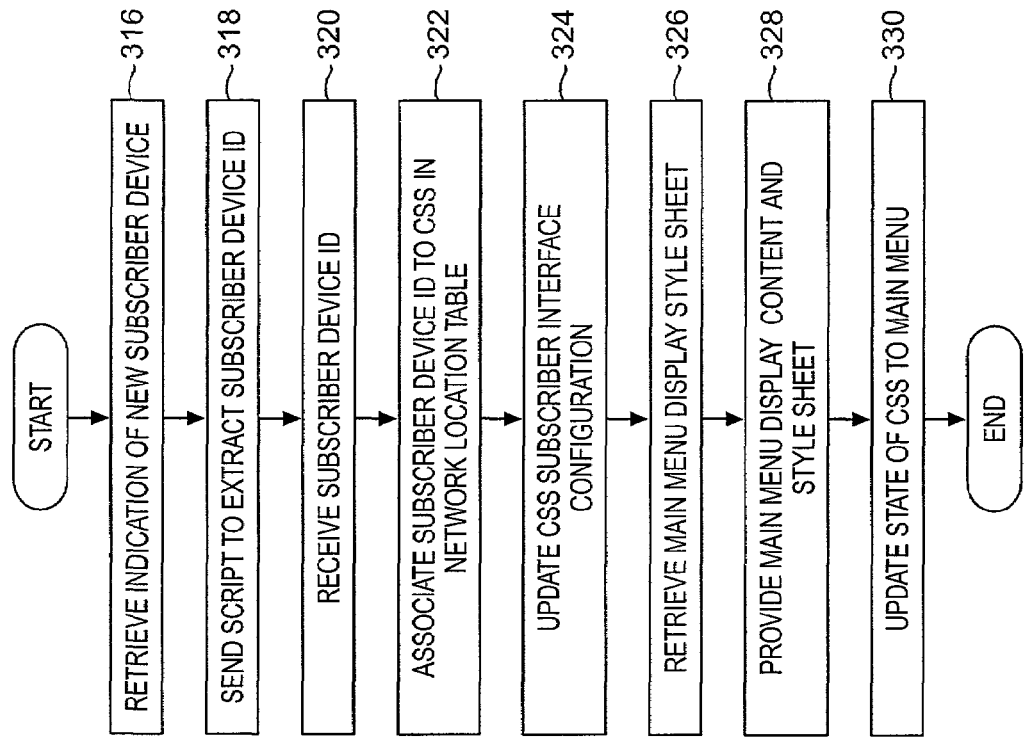
FIGS. 9a through 9g each show a flow chart representing processing steps performed by a multi-media communication management system in accordance with one embodiment of the present invention.
Figure 9A:
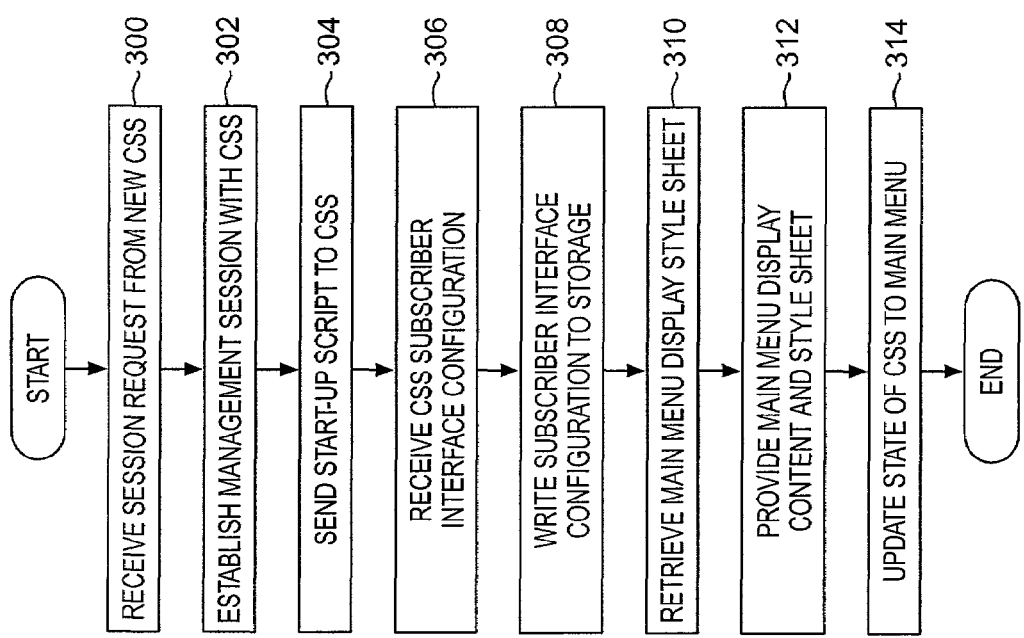

The flowchart of FIG. 9a represents steps performed by the web server application 230 upon receiving an open session request on a predetermined port from a communication space station 24 that has just been operatively coupled to the Local Area network 22, obtained a network address from the network address server 220, and is ready to operate as a client to the web server application 230. Step 300 represents receipt of the open session request and step 302 represents establishing a TCP/IP session with the communication space station 24.

Step 304 represents sending a start up script to the communication space station 24. The start up script includes instructions that, when executed by the system client application 115, provide for the communication space station 24 to detect its subscriber interface configuration (e.g. whether the communication space station 24 includes a display screen and what capabilities such as video capabilities and graphic resolution capabilities the display screen may have) and to report its subscriber interface configuration back to the web server application 230.

Step 306 represents receipt of the subscriber interface configuration of the communication space station 24 from the communication space station 24 and step 308 represents writing an indication of the subscriber interface configuration of the communication space station 24 to a subscriber interface table 239 in the memory 235. Step 310 represents retrieving a main menu display style sheet from a selection of style sheets 241 stored in the memory 235. The retrieved main menu display style sheet will be a style sheet that corresponds to the subscriber interface configuration of the communication space station 24. Step 312 represents providing main menu display content and the style sheet to the communication space station 24 and step 314 represents updating a communication space station state table 243 in the memory 235 to indicate that the communication space station 24 is in a main menu state.

Figure 10B:
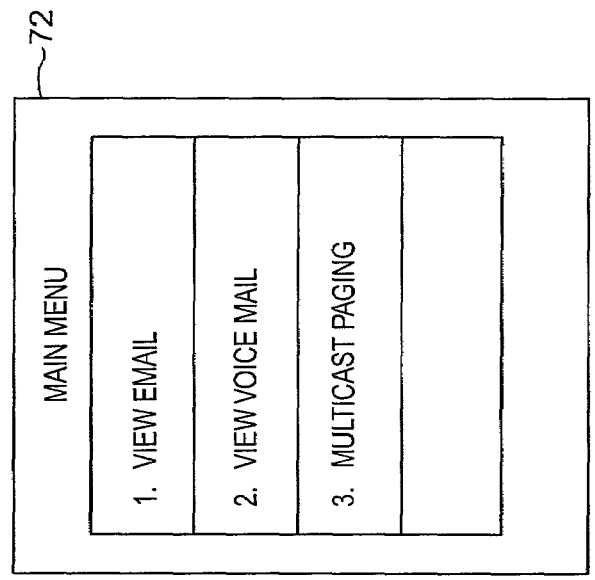
FIGS. 10a through 10d each show an exemplary display of information to a subscriber utilizing a subscriber interface of a communication space station in accordance with one embodiment of the present invention.
Figure 10A:
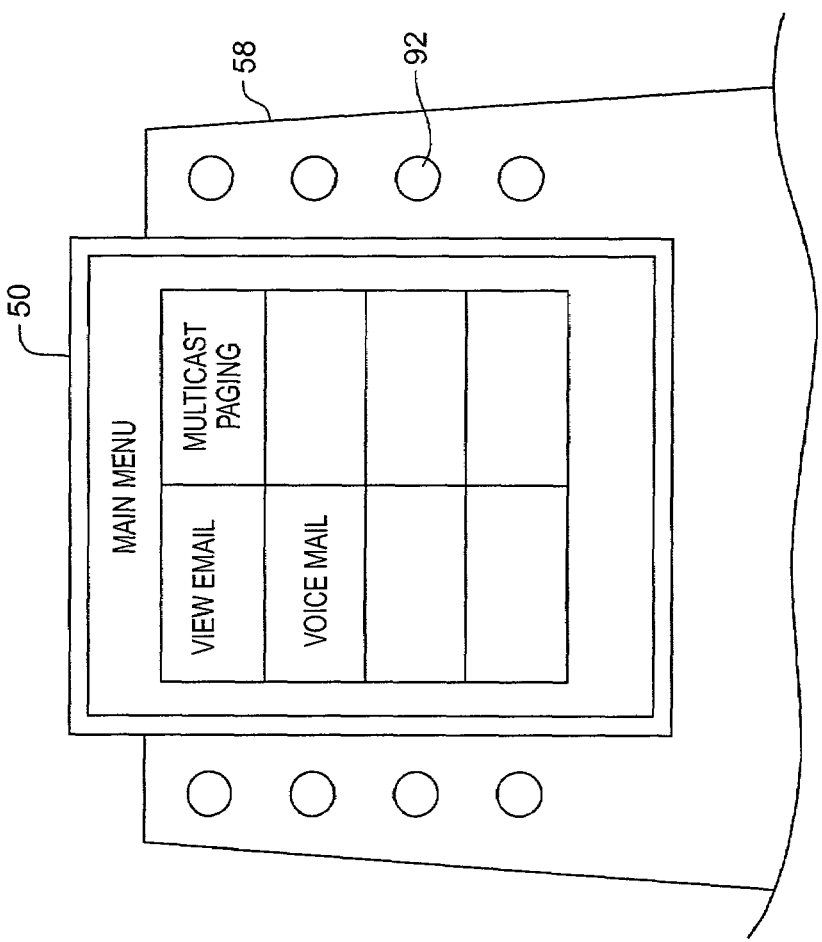

It should be appreciated that the main menu content provided to the communication space station 24 is independent of the subscriber interface. However, the style sheet provided to the communication space station 24 is dependent on the subscriber interface. For example, turning to FIG. 10*a* which represents display of a main menu on a subscriber device 50 in the modular docking interface 58 the content of the main menu display includes a title of main menu and choices of view e-mail, voice mail, and multi-cast paging. The style sheet corresponding to a subscriber interface that includes a subscriber device 50 provides for the content to be graphically displayed with the title at the top and each menu choice to be displayed adjacent a button 92 on the modular docking interface 58. Alternatively, turning to FIG. 10*b* which represents display of a main menu on a display 72 that is coupled to a communication space station interface 64 (FIG. 3), the content of the main menu display again includes a title of main menu and the choices of view e-mail, voice mail, and multi-cast paging. However, the style sheet that corresponds to a subscriber interface that includes a display 72 that is coupled to a communication space station interface 64 provides for the content to be graphically displayed with the title at the top and each choice to be displayed in a vertical list with an adjacent numeral for selection using the keypad 68 (FIG. 3). The examples shown in FIGS. 10*a* and 10*b* are for illustrative purposes only. Other subscriber interface configurations that include non-graphic displays, bit mapped multi line text displays, or 7 element single or multi-line text displays may utilize different style sheets for displaying all or a portion of the main menu content.

The flowchart of FIG. 9*b* represents steps performed by the web server application 230 upon receiving an indication that a subscriber device 50 has been coupled to a communication space station 24. Step 316 represents receipt of such indication. Step 318 represents sending a device ID extraction script to the communication space station 24. The device ID extraction script includes instructions that, when executed by the client application 115, provide for the communication space station 24 to interrogate the subscriber device 50 to determine its device identification (e.g. an identification of which subscriber to which the device has been assigned) and to report the device identification back to the web server application 230.

Step 320 represent receipt of the device identification back from the communication space station 24 and step 322 represents associating the device ID with the communication space station 24 in the network location table 245 in the memory 235. As discussed previously, the packet voice/video gateway 232 utilizes the network location table 245 for routing incoming telephone calls to the particular communication space station 24 at which a subscriber's subscriber device 50 is presently coupled. It should be appreciated that this step 322 provides for the network location table 245 to properly indicate association between a communication space station 24 and the subscriber device 50 that is served thereby.

Because the style sheet selected for display of content on the communication space station 24 is dependent on the subscriber interface configuration of the communication space station 24 as determined by the subscriber interface table 239, the table should be updated when the subscriber interface configuration changes. Coupling a subscriber device 50 to a communication space station 24 changes the subscriber interface because the display of the subscriber device 50 becomes a display for the communication space station 24. As such, step 324 represents updating the subscriber interface configuration of the communication space station 24 in the subscriber interface table 239.

Step 326 represents retrieving a main menu display style sheet that is applicable to the new subscriber interface configuration from the selection of style sheets 241 in the memory 235 and step 328 represents providing main menu display contend and the style sheet to the communication space station 24. Step 330 represents updating the communication space station state table 243 to assure that it represents that the communication space station 24 is in the main menu state.

Figures 9C, 9D:
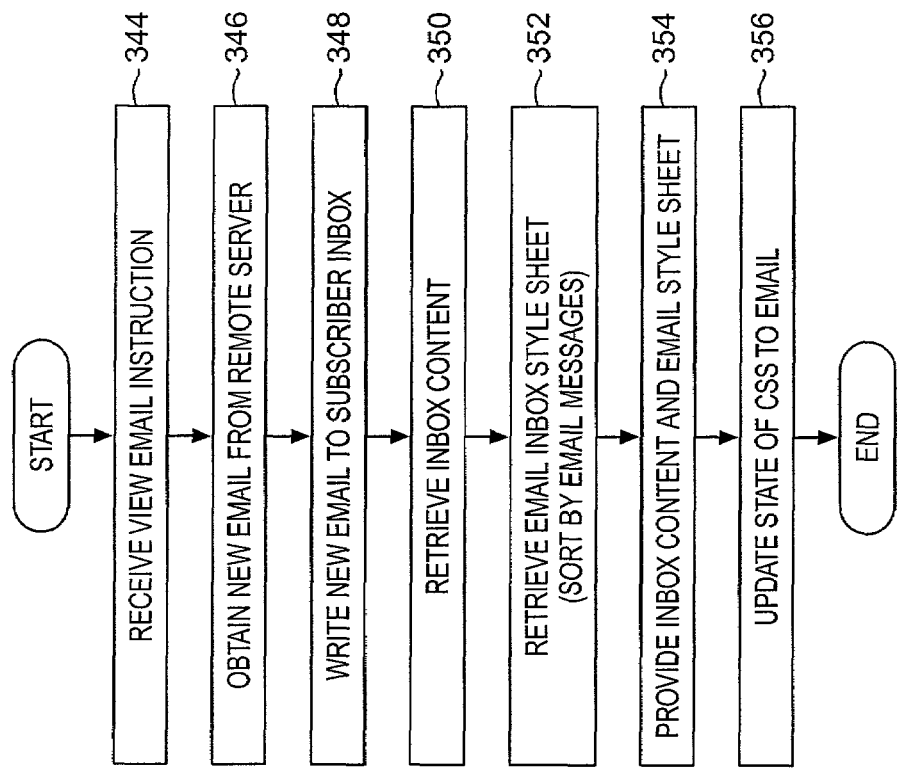

The flow chart of FIG. 9*c* represents steps performed by the web server application 230 upon receiving an indication that a subscriber device 50 has been removed from a communication space station 24. Step 322 represents receipt of such an indication. Because the packet audio/video gateway 232 utilizes the network location table 245 for routing incoming telephone calls to the particular communication space station 24 at which a subscriber's subscriber device 50 is then presently coupled. The network location table should be updated upon removal of a subscriber device form a communication space station 24. Step 334 represents disassociating the subscriber device 50 from the communication space station 24 in the network location table 245. Because the display on the subscriber device 50 is no longer part of the subscriber interface of the communication space station 24 after the subscriber device 50 is removed, step 336 represents updating the subscriber interface configuration table 239.

Step 338 represents retrieving a main menu display style sheet that is applicable to the subscriber interface configuration without the subscriber device 50 from the selection of style sheets 241 in the memory 235 and step 340 represents providing main menu display content and the style sheet to the communication space station 24. Step 342 represents updating the communication space station state table 243 to assure that it represents that the communication space station 24 is in the main menu state.

The flowchart of FIG. 9*d* represents steps performed by the web server application 230 upon receiving a subscriber indication of a command to view subscriber e-mail messages. The means by which the communication space station 24 may detect such a subscriber indication is dependent on the subscriber interface configuration of the communication space station 24. For example, if the subscriber interface includes the e-mail button 78 (FIG. 3), detection of button 78 activation would be a subscriber indication of a command to view subscriber e-mail messages. Similarly, subscriber activation of the e-mail menu choice on the main menu either by touch panel activation or by activation of a button associated with the menu choice (either or both of which may be applicable dependent on the subscriber interface configuration) would be a subscriber indication of a command to view subscriber e-mail messages. Step 344 represents the web server application 230 receiving the subscriber indication of a command view subscriber e-mail messages.

Step 346 represents instructing the e-mail module 228 to logon onto an e-mail server (which may be a remote e-mail server coupled to the Service Provider network 18) and to receive new e-mail messages associated with the subscriber's account. Step 348 represents writing the new e-mail messages to the subscriber inbox in the e-mail files 247 in the memory 235. In an embodiment wherein the remote e-mail server maintains subscriber inbox information, steps 346 and 348 may be viewed as synchronizing the e-mail messages between the remote server and the e-mail files 247. It should also be appreciated that the e-mail module 228 may periodically retrieve new e-mail messages and write to the subscriber inbox independently of whether the subscriber has activated an e-mail control. As such, the inbox already includes new messages and steps 348 and 348 may not need to be performed in response to event 344.

Step 350 represents retrieving inbox content from the e-mail files 247 and step 352 represents retrieving an inbox style sheet that is applicable to the subscriber interface from the style sheets 241 in the memory 235. Because the subscriber's voice mails are sent to the subscriber's e-mail account as audio files, it is possible that the e-mail messages retrieved at step 346 include both text based e-mails and e-mails from the voice mail server 226. Because the subscriber activated a command to view e-mail messages, the inbox style sheet provides for the display of the e-mail messages received from senders other than the voice mail server 226 to be displayed first (or on the top of the display).

Step 354 represents providing the inbox content and style sheet to the communication space station 24 and step 356 represents updating the communication space station state table 243 to indicate that the communication space station 24 is in an e-mail state.

Figure 9F:
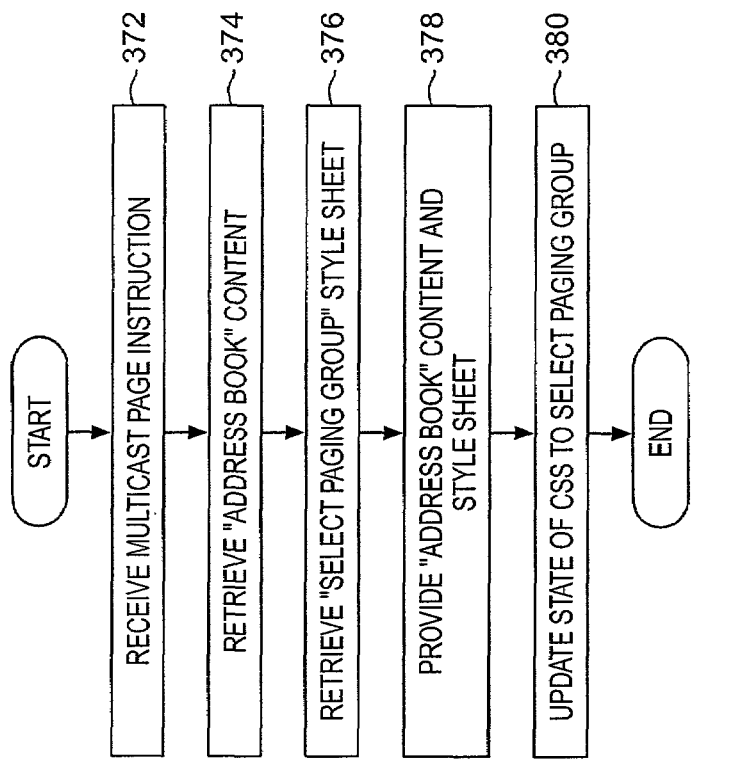
Figure 9E:
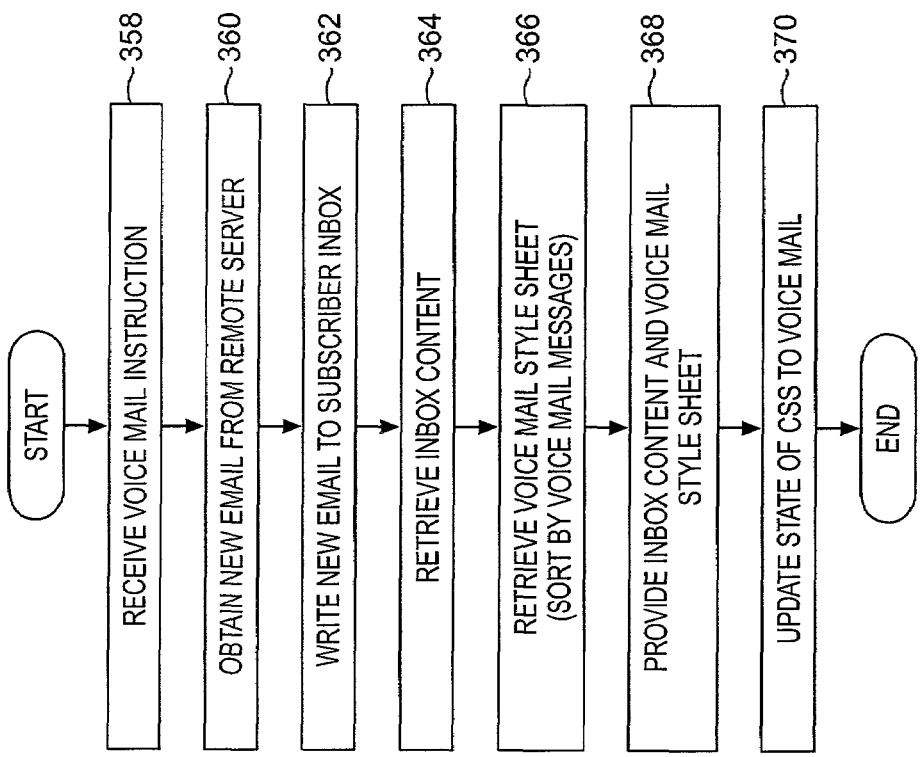

The flowchart of FIG. 9*e* represents steps performed by the web server application 230 receiving a subscriber indication of a command to obtain voice mail messages. Again, the means by which the communication space station 24 may detect such a subscriber indication is dependent on the subscriber interface configuration of the communication space station 24. For example, if the subscriber interface includes the voice mail button 76 (FIG. 3), detection of button 76 activation is a subscriber indication of a command to obtain voice mail messages. Similarly, subscriber activation of the voice mail menu choice either by touch panel activation or by activation of a button associated with the menu choice is a subscriber indication of a command to obtain voice mail messages. Step 358 represents the web server application 230 receiving the subscriber indication of a command obtain voice mail messages.

Because voice mail messages are sent as audio files form the voice mail server 226 to the subscriber's e-mail account, step 360 represents instructing the e-mail module 228 to logon onto the e-mail server and to receive new e-mail messages associated with the subscribers account. Step 362 represents writing the new e-mail messages to the subscriber inbox in the e-mail files 247 in the memory 235.

Step 364 represents retrieving inbox content from the e-mail files 247 and step 366 represents retrieving an voice mail style sheet that is applicable to the subscriber interface from the style sheets 241 in the memory 235. Because the e-mail messages that include voice mail audio files from the voice mail server 226 may be intermixed with e-mail messages from other senders, the voice mail style sheet provides for only the display of the voice mail messages received from the voice mail server 226.

Step 368 represents providing the inbox content and the voice mail style sheet to the communication space station 24 and step 370 represents updating the communication space station state table 243 to indicate that the communication space station 24 is in a voice mail state.

The flowchart of FIG. 9*f* represents steps performed by the web server application 230 upon receiving a subscriber indication of a command to initiate a multicast paging message. The communication space station 24 may detect such a subscriber indication by various means, such as touch panel activation of button activation of a menu selection on the main menu, dependent on the subscriber interface configuration of the communication space station 24. Step 372 represents the web server application 230 receiving the subscriber indication of a command to initiate a multicast paging message.

Step 374 represents retrieving the subscriber's address book content 249 from the e-mail files 247. Turning briefly to FIG. 8*b*, the address book content 249 may comprise a plurality of records with each record including a group identification name and identification of each subscriber in such group, and, if the group identifies a single person, contact information for the person.

Step 376 represents retrieving a select paging group style sheet that corresponds to the subscriber interface of the communication space station 24 and step 378 represents providing both the address book content and the select paging group style sheet to the communication space station 24. Step 380 represents updating the communication space station state table 243 to indicate that the communication space station 24 is in the select paging group state.

Figure 10D:
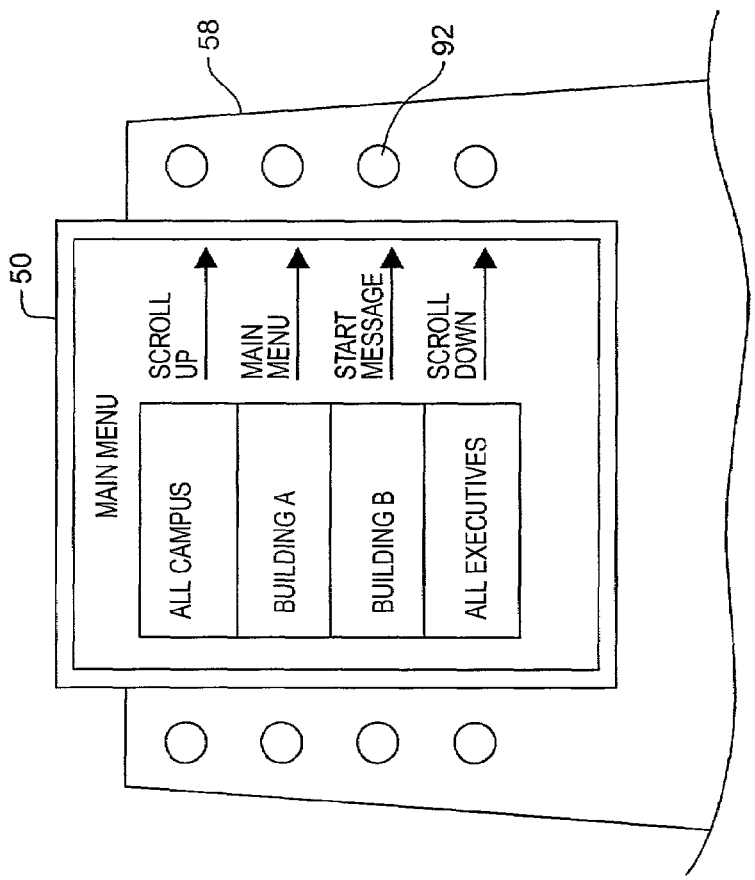
Figure 10C:
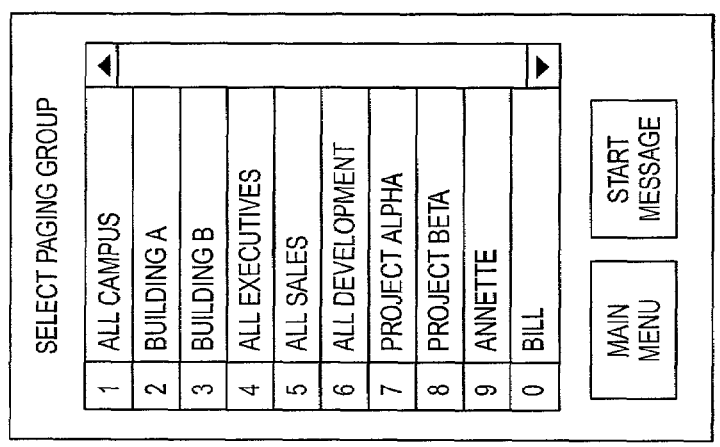

FIG. 10*c* represents an exemplary display of the select paging group content utilizing a style sheet that may be applicable for use on a display 72 wherein the subscriber may use buttons or touch panel activation may be utilized to select one or more paging groups to include in the multicast page. It should be appreciated that some paging groups may include only a single name such that individuals may be selected to include in the multicast page. Because the list of groups included in the paging group content may be larger than can be displayed on the display 72, the style sheet may provide for only a portion of the content to be displayed along with touch activated scroll controls for display of the remainder of the content. The style sheet may further include touch activated controls to return to the main menu and to start the multicast message.

FIG. 10d represents an exemplary display of the select paging group content utilizing a style sheet that may be applicable for display of the content on a display of a subscriber device 50 coupled in the modular docking interface 58. Because subscriber selection is to be by activation of buttons 92, the style sheet provides for the content to be displayed with the groups on the left side for selection by buttons 92 on the left side of the modular docking interface 58 and for indicators to label the function of the buttons 92 on the right side of the modular docking interface 58 such as scroll up, scroll down, start message, and return to main menu.

Figure 9G:
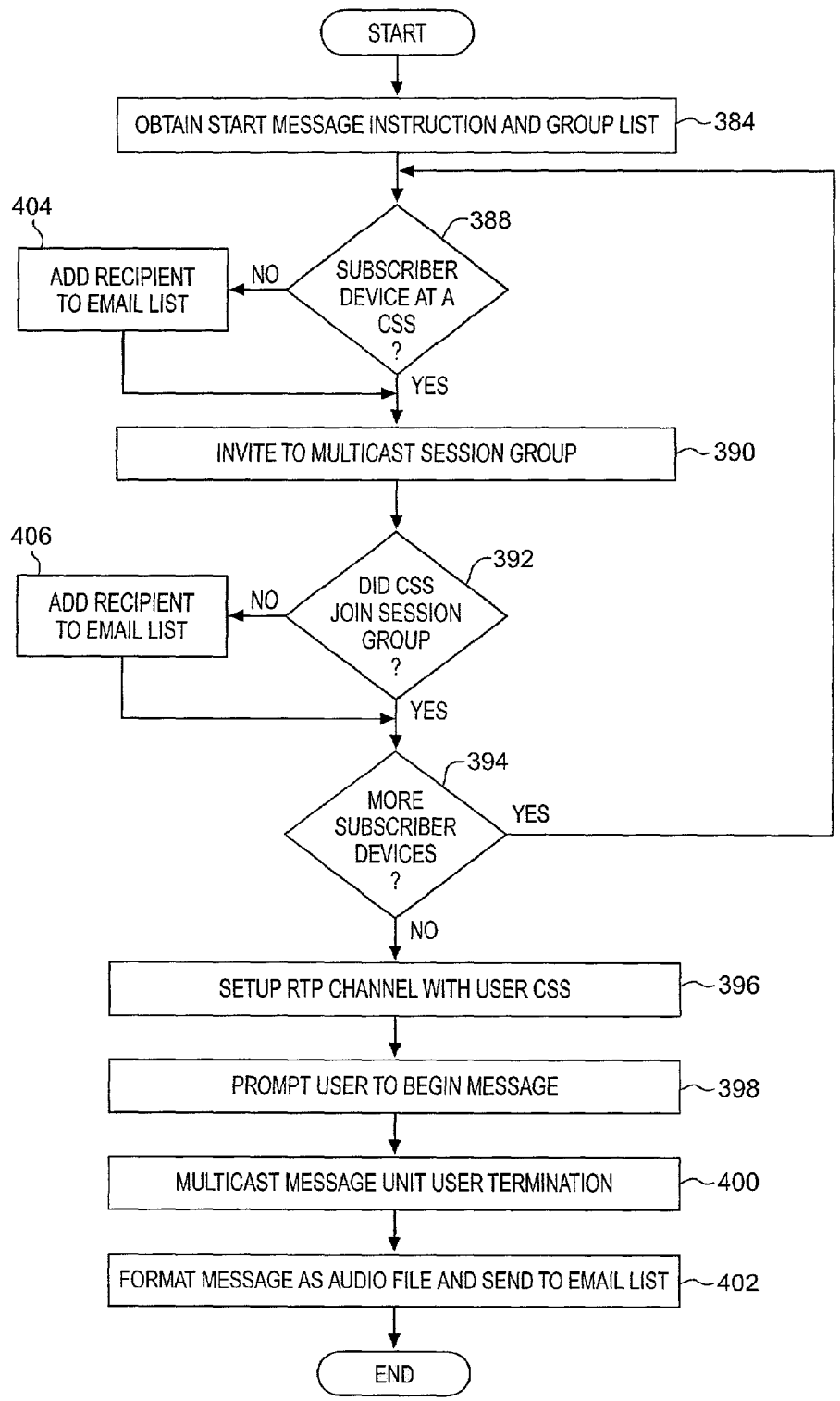

The flowchart of FIG. 9g represents steps performed by the web server application 230 upon receiving a subscriber indication of a command to start the multicast paging message. Step 384 represents receipt of such a subscriber indication along with identification of the subscriber selected multicast groups to include in a multicast recipient list. Steps 388 through 394 represents steps that are performed by the web server application 230 for each recipient. Such steps may be performed in sequence or in parallel. For purposes of illustration, the steps are shown performed in sequence. Step 388 represents identifying the subscriber device 50 that is associated with the recipient and determining if the subscriber device is then presently coupled to a communication space station 24. If yes, at step 390 the web server application 230 transmits a message to the communication space station 24 to indicate activation of the multicast session group. However, if the subscriber device 50 associated with the recipient is not coupled to a communication space station 24 where the subscriber may receive the multicast, then at step 404 the recipient is added to an e-mail list.

Following step 390, step 392 represents determining whether the communication space station 24 joined the multicast session group. If the communication space station 24 is operating a voice session, it would be inappropriate to interrupt the voice session with a multicast page for the subscriber. As such, it is envisioned that the communication space station 24 may, when in certain operational states, not join the multicast session group. In which case, the recipient is added to the e-mail list at step 406. At that time, the voice mail 236 is also invited to the multicast session group as an agent for all recipients on the e-mail list.

After the recipient is either added to the e-mail list at step 405 or the communication space station 24 joined the multicast session group at step 392, step 394 represents determining if steps 388 though 392 must be performed for additional recipients. If not, step 396 represents establishing a RTP channel with the communication space station 24 that initiated the multicast paging message and step 398 represent instructing the web server to prompt the subscriber to begin the multicast paging message.

Step 400 represents multicasting the message to the session group utilizing the multicast module 231 and step 402 instructing the voice mail module to terminate the multicast message, build an audio file, and send the audio file by e-mail to each recipient that was added to the e-mail list at either step 404 or 406.

It should be appreciated that the systems and methods of the present invention provide for the communication and control of multi-media messages by a central control unit and for the provision of multicast paging messages across communication space stations associated with selected recipients.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. A multi-media communication management system for operation with a plurality of subscriber stations, the multi-media communication management system comprising:
   a network communication circuit for multi-media communication with said plurality of subscriber stations;
   a control module for establishing a communication session with each of the subscriber stations through the network communication circuit, the control module comprising:
      means for receiving an indication of a plurality of recipients to receive a multicast message;
      means for identifying a plurality of recipient subscriber stations, each recipient subscriber station being one of the subscriber stations that is associated with a corresponding one of the plurality of recipients;
      means for transmitting a message to each one of the recipient subscriber stations to participate in a session group;
      means for multicasting a voice message to the recipient subscriber stations that are participating in said session group
      means for identifying a plurality of recipients that are not associated with any of the subscriber stations; and
      means for sending an audio file comprising the voice mail message to a plurality of e-mail address, each email address being associated with one of the plurality of recipients that are not associated with any of the subscriber stations.

2. A multi-media communication management system for operation with a plurality of subscriber stations, the multi-media communication management system comprising:
   a network communication circuit for multi-media communication with said plurality of subscriber stations;
   a control module for establishing a communication session with each of the subscriber stations through the network communication circuit, the control module comprising:
      means for receiving an indication of a plurality of recipients to receive a multicast message;
      means for identifying a plurality of recipient subscriber stations, each recipient subscriber station being one of the subscriber stations that, is associated with a corresponding one of the plurality of recipients;
      means for transmitting a message to each one of the recipient subscriber stations to participate in a session group;
      means for multicasting a voice message to the recipient subscriber stations that are participating in said session group
      means for identify those of the plurality of the subscriber stations invited to the session group that do not receive the voice message; and means for sending an audio file comprising the voice mail message to a plurality of e-mail address, each email address being associated with one of the plurality of recipients that are not associated with any of the subscriber stations.

3. A method of multicasting a voice message to selected subscribers to a multimedia communication management system, the method comprising:
   receiving an indication of a plurality of recipients to receive a multicast message;
   identifying a plurality of recipient subscriber stations, each recipient subscriber station being a subscriber stations that is associated with a recipient of the multicast message;
   inviting each one of the recipient subscriber stations to a session group;
   multicasting a voice message to the session group
   identifying a plurality of recipients that are not associated with any of the subscriber stations;
   sending an audio file comprising the voice mail message to a plurality of e-mail addresses, each email address being associated with one of the plurality of recipients that are not associated with any of the subscriber stations.

4. A method of multicasting a voice message to selected subscribers to a multimedia communication management system, the method comprising:
   receiving an indication of a plurality of recipients to receive a multicast message;
   identifying a plurality of recipient subscriber stations, each recipient subscriber station being a subscriber stations that is associated with a recipient of the multicast message;
   inviting each one of the recipient subscriber stations to a session group;
   multicasting a voice message to the session group
   identifying those of the plurality of the subscriber stations invited to the session group that do not receive the voice message; and
   sending an audio file comprising the voice mail message to a plurality of e-mail address, each email address being associated with one of the plurality of recipients that are associated with one of those subscriber stations invited to the session group that did not receive the voice message.

* * * * *